United States Patent
Lee et al.

(10) Patent No.: US 10,448,100 B2
(45) Date of Patent: Oct. 15, 2019

(54) DISPLAY APPARATUS AND CONTROL METHOD THEREOF

(71) Applicant: SAMSUNG ELECTRONICS CO., LTD., Suwon-si (KR)

(72) Inventors: Kye-rim Lee, Seoul (KR); Ronan Bouroullec, Paris (FR); Erwan Bouroullec, Paris (FR); Gael Hugo, Paris (FR); Song-ah Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/166,754

(22) Filed: May 27, 2016

(65) Prior Publication Data

US 2016/0353165 A1  Dec. 1, 2016

(30) Foreign Application Priority Data

May 28, 2015  (KR) .................. 10-2015-0074965
May 3, 2016   (KR) .................. 10-2016-0054921

(51) Int. Cl.
*H04N 21/431*   (2011.01)
*G06F 3/0484*   (2013.01)
*H04N 5/44*     (2011.01)
*H04N 21/443*   (2011.01)
*H04N 21/426*   (2011.01)
(Continued)

(52) U.S. Cl.
CPC ..... *H04N 21/4438* (2013.01); *G06F 3/04847* (2013.01); *H04N 5/4403* (2013.01); *H04N 5/57* (2013.01); *H04N 21/42653* (2013.01); *H04N 21/4312* (2013.01); *H04N 21/4316* (2013.01); *H04N 21/4318* (2013.01);
(Continued)

(58) Field of Classification Search
CPC ............. H04N 1/00413; H04N 21/4438
USPC ........ 348/563, 564, 565, 566; 345/156, 160, 345/163, 168, 169
See application file for complete search history.

(56) References Cited

U.S. PATENT DOCUMENTS

| 4,357,624 A | * | 11/1982 | Greenberg | ............ G06T 11/001 348/578 |
| 5,679,911 A | * | 10/1997 | Moriyama | ............. G10H 1/361 84/601 |

(Continued)

FOREIGN PATENT DOCUMENTS

| CN | 104090709 A | 10/2014 |
| JP | 11-218562 A | 8/1999 |

(Continued)

OTHER PUBLICATIONS

Communication dated Oct. 18, 2016, issued by the European Patent Office in counterpart European Application No. 16171580.0.

(Continued)

*Primary Examiner* — Paulos M Natnael
(74) *Attorney, Agent, or Firm* — Sughrue Mion, PLLC

(57) ABSTRACT

A display apparatus including: a display; a user input configured to issue a command for executing a GUI; and a processor configured to process a first image including an object to be displayed on the display, and process the GUI corresponding to an outline of the object to be displayed on the display in response to receiving the command for executing the GUI from the user input while the first image is displayed.

22 Claims, 35 Drawing Sheets

(51) Int. Cl.
*H04N 21/4402* (2011.01)
*H04N 21/485* (2011.01)
*H04N 5/57* (2006.01)
*H04N 21/478* (2011.01)
*H04N 21/81* (2011.01)

(52) U.S. Cl.
CPC ....... *H04N 21/4402* (2013.01); *H04N 21/478* (2013.01); *H04N 21/485* (2013.01); *H04N 21/8153* (2013.01)

(56) References Cited

U.S. PATENT DOCUMENTS

| | | | |
|---|---|---|---|
| 6,577,350 B1 | 6/2003 | Proehl et al. | |
| 6,606,746 B1* | 8/2003 | Zdepski | G06T 9/007 375/240.26 |
| 7,053,915 B1* | 5/2006 | Jung | G10H 1/368 345/629 |
| 7,100,118 B1* | 8/2006 | Klask | G06F 9/4443 345/532 |
| 8,125,540 B2* | 2/2012 | Yi | G06F 3/1423 348/239 |
| 8,429,612 B2 | 4/2013 | Milov | |
| 8,824,861 B2* | 9/2014 | Gentile | G06T 5/50 386/278 |
| 2001/0011194 A1* | 8/2001 | Claar | G11B 27/034 700/94 |
| 2002/0109734 A1* | 8/2002 | Umezu | G01R 13/00 715/846 |
| 2007/0009028 A1* | 1/2007 | Lee | H04N 7/147 375/240.08 |
| 2007/0274520 A1* | 11/2007 | Ogata | H04L 63/0435 380/201 |
| 2008/0189656 A1 | 8/2008 | Abanami et al. | |
| 2009/0059094 A1* | 3/2009 | Yi | G09B 5/06 348/744 |
| 2010/0054584 A1 | 3/2010 | Schadt et al. | |
| 2010/0177234 A1 | 7/2010 | Ogura et al. | |
| 2010/0215287 A1* | 8/2010 | Jeon | G06K 9/6205 382/281 |
| 2011/0033170 A1* | 2/2011 | Ikeda | G11B 27/034 386/244 |
| 2011/0119702 A1 | 5/2011 | Jang et al. | |
| 2011/0126237 A1 | 5/2011 | Lee et al. | |
| 2011/0249073 A1 | 10/2011 | Cranfill et al. | |
| 2012/0019631 A1 | 1/2012 | Kim et al. | |
| 2012/0236201 A1* | 9/2012 | Larsen | G06Q 10/10 348/468 |
| 2012/0243786 A1 | 9/2012 | Koyama et al. | |
| 2013/0021629 A1 | 1/2013 | Kurilin et al. | |
| 2013/0254655 A1* | 9/2013 | Nykyforov | G06F 17/211 715/244 |
| 2014/0055484 A1* | 2/2014 | Moon | G06T 11/001 345/593 |
| 2014/0085680 A1* | 3/2014 | Kuwano | H04N 1/40062 358/2.1 |
| 2014/0169683 A1* | 6/2014 | Wang | G06F 17/30259 382/199 |
| 2014/0263967 A1 | 9/2014 | Wober | |
| 2015/0089553 A1 | 3/2015 | Hunt et al. | |
| 2015/0117725 A1* | 4/2015 | He | G06K 9/00268 382/118 |
| 2015/0363953 A1 | 12/2015 | Liu | |
| 2016/0093020 A1* | 3/2016 | Basalamah | H04N 5/225 345/634 |
| 2016/0142580 A1* | 5/2016 | Sakahara | H04N 1/2154 348/207.2 |
| 2016/0232314 A1* | 8/2016 | Hsieh | G06F 19/3406 |
| 2016/0277633 A1* | 9/2016 | Kawakami | H04N 1/393 |
| 2016/0299676 A1* | 10/2016 | Yoon | G06F 3/04847 |
| 2017/0003866 A1* | 1/2017 | Bennett | G06F 3/0484 |
| 2017/0244908 A1* | 8/2017 | Flack | G06K 9/00234 |
| 2018/0165052 A1* | 6/2018 | Kim | G06F 3/0487 |

FOREIGN PATENT DOCUMENTS

| | | |
|---|---|---|
| KR | 10-2009-0024402 A | 3/2009 |
| KR | 10-2011-0057527 A | 6/2011 |

OTHER PUBLICATIONS

Communication dated Aug. 24, 2016, issued by the International Searching Authority in counterpart International Application No. PCT/KR2016/005604 (PCT/ISA/210).
Communication dated Mar. 27, 2017 by the Korean Intellectual Property Office in counterpart Korean Patent Application No. 10-2016-0054921.
Communication dated Dec. 5, 2018, issued by the European Patent Office in counterpart European Application No. 16171580.0.
Communication dated May 9, 2019 issued by the European Patent Office in counterpart European patent Application No. 16171580.0.

* cited by examiner

DISPLAY APPARATUS AND CONTROL METHOD THEREOF

CROSS-REFERENCE TO RELATED THE APPLICATIONS

This application claims priority from Korean Patent Application No. 10-2015-0074965 filed on May 28, 2015, and Korean Patent Application No. 10-2016-0054921 filed on May 3, 2016, in the Korean Intellectual Property Office, the disclosures of which are incorporated herein by reference in their entireties.

BACKGROUND

1. Field

Apparatuses and methods consistent with the exemplary embodiments relate to displaying an image of various types of content as well as a broadcast program and an image of various preset additional services and a control method thereof, and more particularly, to decreasing a user's visual fatigue while an video content is switched to an additional service and a control method thereof.

2. Description of the Related Art

An image processing apparatus processes an image signal and/or video data received from the external device in accordance with various video processing processes. The image processing apparatus may display an image based on the processed video data on its own display panel, or output the processed image signal to another display apparatus provided with a panel so that on the corresponding display apparatus can display an image based on the processed image signal. That is, the image processing apparatus may include the panel capable of displaying an image or include no panel as long as it can process the video data. For example, the former may include a display apparatus such as a television (TV), and the latter may include a set-top box.

With development of technology and increase in demand, the display apparatus achieved by a television (TV), a tablet computer, a mobile phone, etc., has been proposed to display video content and also provide various additional services. For example, the display apparatus provides various image-based services such as play of a game, display of a web page, notification of time or weather based on an installation location, notification of today's date, display of a still image such as a photograph, display of a text, activation and use of hardware components installed in the display apparatus, configuration settings for the display apparatus, etc. Further, such an additional service may be provided as a network-based service when the display apparatus is connected to an external network by wired or wireless communication, or as a client-based service regardless of connection with an external network.

A user may make a certain trigger event be generated while video content is being displayed on the display apparatus, and thus instruct the display apparatus to initiate an additional service from the video content. When the display apparatus initiates the additional service in response to the trigger event, a sudden change occurs from the image of the video content to the additional service. This sudden change may make a user feel visual fatigue, and the visual fatigue may become serious when the image of the video content includes large motion or when the images are displayed on a full-screen.

SUMMARY

Exemplary embodiments may address at least the above problems and/or disadvantages and other disadvantages not described above. Also, exemplary embodiments are not required to overcome the disadvantages described above, and may not overcome any of the problems described above.

According to an aspect of an exemplary embodiment, there is provided a display apparatus including: a display; a user input configured to issue a command for executing a graphical user interface (GUI); and a at least one processor configured to process a first image including at least one object to be displayed on the display, and process a GUI corresponding to an outline of the at least one object to be displayed on the display if receiving a command for executing the GUI from the user input while displaying the first image. The at least one processor may generate a second image corresponding to the outline of the at least one object by processing preset image information acquired from the first image, and may process the second image to be displayed as a background image of the GUI. Thus, a visual feedback of the first image is continuously provided to a user while the first image of the video content is not displayed due to the display of the GUI, thereby preventing discontinuity in a user's viewing experience to the first image as far as possible. Further, sudden change is prevented when the first image is switched to the GUI, thereby decreasing a user's visual fatigue.

The at least one processor may acquire the image information changed by reproduction of the first image in real time, and may process the second image to be varied depending on the image information acquired in real time. Thus, it is possible to prevent the visual feedback from being discontinued due to the reproduction of the first image, by making change in the second image even while the first image is not displayed.

The at least one processor may adjust the first generated second image based on grayscale, and may gradually change red, green and blue (RGB) values of the second image so that the second image can be changed with respect to a preset color as time passes. Thus, it is possible to protect a user from visual fatigue due to sudden change in color when the first image is switched to the second image based on a certain color.

The image information may include RGB values of each pixel included in a certain image frame of the first image. The second image may be generated by dividing the image frame into a plurality of sections, applying brightness and transparency derived corresponding to RGB values of the pixels included in each divided section to each divided section, adjusting a horizontal width of each divided section corresponding to the brightness, and applying blur filtering to each divided section. The at least one processor may adjust the horizontal width of the divided section having higher brightness to be more decreased, but may adjust the horizontal width of the divided section having lower brightness to be less decreased. The at least one processor may apply the blur filtering to left and right edges among up, down, left and right, i.e., four edges of the divided section. Thus, when the first image is switched to the second image, a soft wave effect may be provided to lessen a user's visual fatigue.

One or more GUIs may be provided with regard to each of a plurality of preset services, and the one or more GUIs provided corresponding to each service may be previously set to be switched therebetween in response to a command issued through the user input for movement in up, down, left and right, i.e., four directions. The at least one processor may switch between the GUIs of different services in response to a command issued through the user input for movement in up and down directions, and may switch between the GUIs of one service in response to a command issued through the user input for movement in left and right directions. Thus, a user can more easily use additional services since the service is switched and the image is displayed by only an intuitive command for movement in the up, down, left and right, i.e., four directions.

According to an aspect of another exemplary embodiment, there is provided a method of controlling a display apparatus, the method including: displaying a first image including at least one object; receiving a command for executing a GUI from a user while displaying the first image; and displaying a GUI corresponding to an outline of the at least one object. The displaying the GUI may include: generating a second image corresponding to the outline of the at least one object by processing preset image information acquired from the first image; and processing the second image to be displayed as a background image of the GUI. Thus, a visual feedback of the first image is continuously provided to a user while the first image of the video content is not displayed due to the display of the GUI, thereby preventing discontinuity in a user's viewing experience to the first image as far as possible. Further, sudden change is prevented when the first image is switched to the GUI, thereby decreasing a user's visual fatigue.

The displaying the GUI may include acquiring the image information changed by reproduction of the first image in real time, and processing the second image to be varied depending on the image information acquired in real time. Thus, it is possible to prevent the visual feedback from being discontinued due to the reproduction of the first image, by making change in the second image even while the first image is not displayed.

The displaying the GUI may include adjusting the first generated second image based on grayscale, and gradually changing red, green and blue (RGB) values of the second image so that the second image can be changed with respect to a preset color as time passes. Thus, it is possible to protect a user from visual fatigue due to sudden change in color when the first image is switched to the second image based on a certain color.

The image information may include RGB values of each pixel included in a certain image frame of the first image. The generating the second image may include: dividing the image frame into a plurality of sections; applying brightness and transparency derived corresponding to RGB values of the pixels included in each divided section to each divided section; adjusting a horizontal width of each divided section corresponding to the brightness; and applying blur filtering to each divided section. The adjusting the horizontal width of each divided section corresponding to the brightness may include: adjusting the horizontal width of the divided section having higher brightness to be more decreased; and adjusting the horizontal width of the divided section having lower brightness to be less decreased. The applying the blur filtering to each divided section may include applying the blur filtering to left and right edges among up, down, left and right, i.e., four edges of the divided section. Thus, when the first image is switched to the second image, a soft wave effect may be provided to lessen a user's visual fatigue.

One or more GUIs may be provided with regard to each of a plurality of preset services, and the one or more GUIs provided corresponding to each service may be previously set to be switched therebetween in response to a command issued through the user input for movement in up, down, left and right, i.e., four directions. The method may further including: switching between the GUIs of different services in response to a command issued through the user input for movement in up and down directions; and switching between the GUIs of one service in response to a command issued through the user input for movement in left and right directions. Thus, a user can more easily use additional services since the service is switched and the image is displayed by only an intuitive command for movement in the up, down, left and right, i.e., four directions.

BRIEF DESCRIPTION OF THE DRAWINGS

The above and/or other aspects will become more apparent by describing certain exemplary embodiments with reference to the accompanying drawings, in which.

DETAILED DESCRIPTION OF EXEMPLARY EMBODIMENTS

Figure 1:
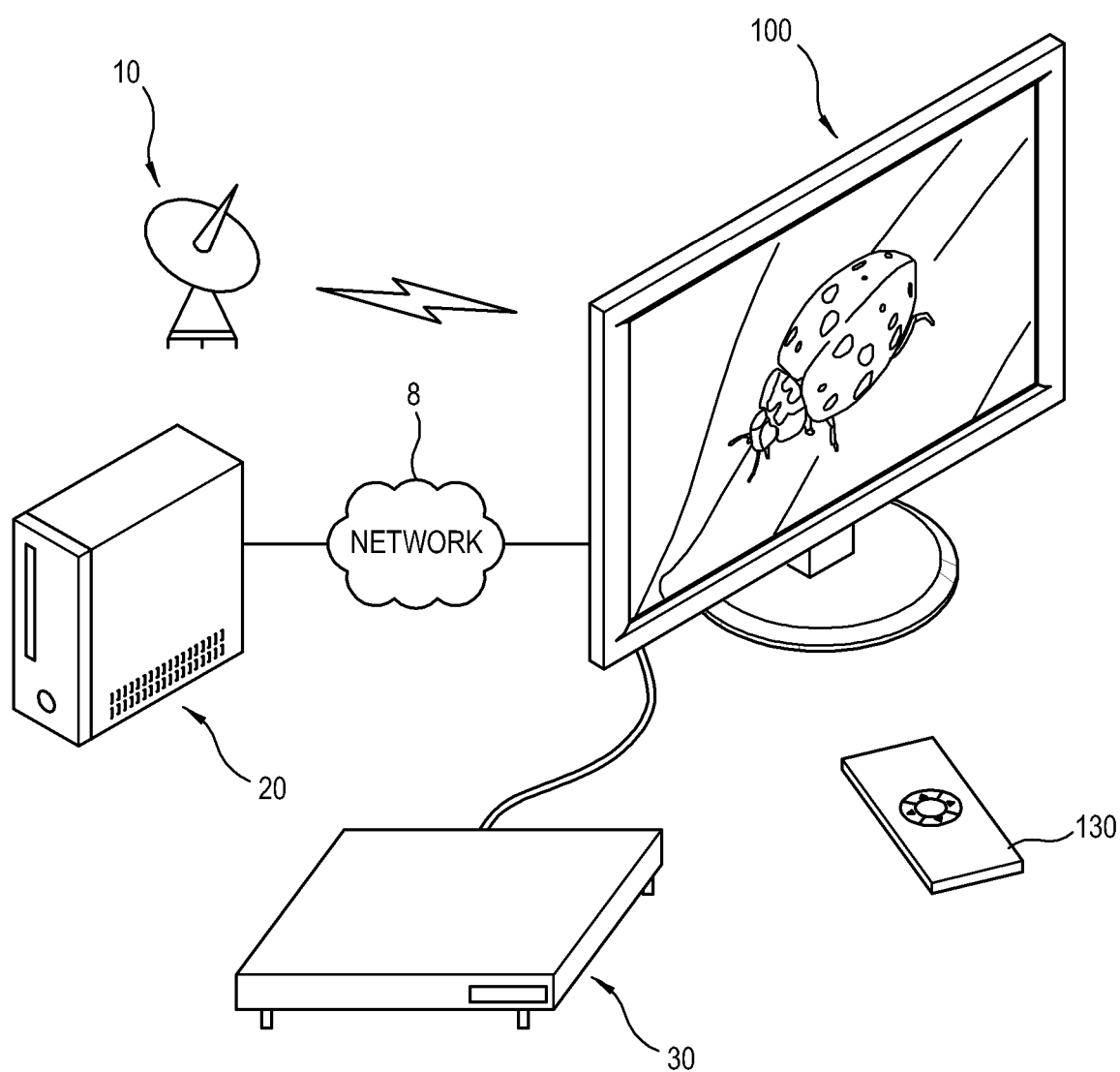
FIG. 1 illustrates an example of a display apparatus according to a an exemplary embodiment.

Certain exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

In the description of the exemplary embodiments, an ordinal number used in terms such as a first element, a second element, etc., is employed for describing variety of elements, and the terms are used for distinguishing between one element and another element. Therefore, the meanings of the elements are not limited by the terms, and the terms are also used just for explaining the corresponding embodiment without limiting.

Further, the exemplary embodiments will describe only elements directly related to exemplary embodiments. However, it will be appreciated that the elements, the descriptions of which are omitted, are not unnecessary to realize the apparatus or system according to the exemplary embodiments. In the following descriptions, terms such as "include" or "have" refer to presence of features, numbers, steps, operations, elements or combination thereof, and do not exclude presence or addition of one or more other features, numbers, steps, operations, elements or combination thereof.

FIG. 1 illustrates an example of a display apparatus 100 according to an exemplary embodiment.

As shown in FIG. 1, the display apparatus 100 according to an exemplary embodiment includes a TV, but not limited thereto. As another example, the display apparatus may include a tablet computer, a mobile phone, a multimedia player, an electronic frame, a digital billboard, and the like electronic apparatus capable of displaying an image. Further, the display apparatus 100 may include a stationary apparatus installed at one place and a mobile apparatus freely carried and used by a user. Further, the exemplary embodiment may be also applied to an image processing apparatus provided with a separate monitor for displaying an image, as well as an apparatus capable of displaying an image by itself like the display apparatus 100.

The display apparatus 100 processes data of video content received from an external device and displays an image. The video content may be transmitted as a radio frequency broadcast signal from a transmitter 10 of a broadcasting station, transmitted as a data packet through a network 8 from a server 20, or reproduced and transmitted from a multimedia player 30 locally connected to the display apparatus. Further, the video content may be stored as digital data in the display apparatus 100.

The display apparatus 100 includes a user input device 130 allowing a user to select video content from one of video sources 10, 20 and 30. For example, a remote controller physically separated from a main body of the display apparatus 100 may be used as the user input device 130. If a user selects one of the video sources 10, 20 and 30 through the user input device 130, the display apparatus 100 processes the video content received from the selected one of the video sources 10, 20 and 30 and displays an image based on the processed video content. For example, if a user selects a certain broadcast channel through the user input device 130, the display apparatus 100 is tuned to the selected broadcast channel and receives a broadcast signal transmitted from the transmitter 10 of the broadcasting station corresponding to the tuned broadcast channel, thereby displaying a broadcast image.

The display apparatus 100 has functions of displaying images based on the video content received from the video sources 10, 20 and 30, and providing various additional services to a user. Here, the additional service refers to various services provided by the display apparatus 100 in addition to a service of processing the video content to be displayed as an image, and is not limited to a certain service. Further, the additional service may be provided based on a network or client.

For example, the additional service includes various kinds and types of services such as a service of setting configuration of the display apparatus 100 or user environment; a service of notifying date, time, weather, etc., based on an installed location or used location of the display apparatus 100; a service of displaying a photograph, a picture, etc., accessible through a network or locally stored; a service of displaying a certain web page though a web browser; and so on.

While an image of video content is displayed, a user may issue a command through the user input device 130 so as to view an image of a certain additional service. In response to a user's command, the display apparatus 100 operates to display the image of the additional service instead of the video content.

Figure 2:
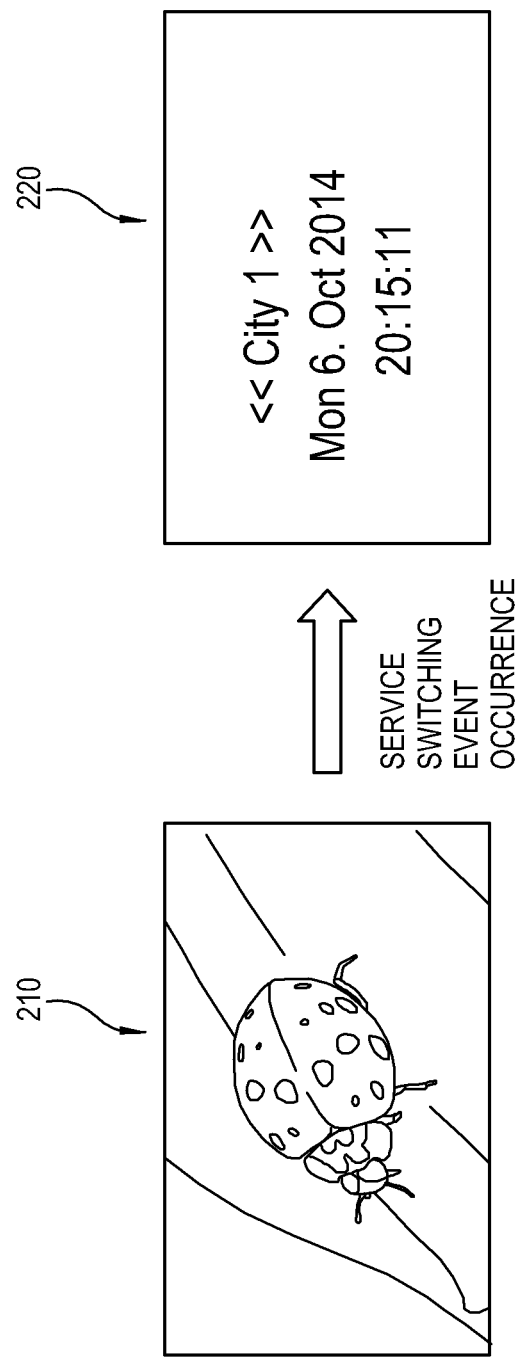
FIG. 2 illustrates an example of a switch from a content image to a service image when a service switch event occurs in the display apparatus of FIG. 1.

FIG. 2 illustrates an example of a switch from a content image 210 to a service image 220 when a service switch event occurs in the display apparatus 100 of FIG. 1.

As shown in FIG. 2, the display apparatus 100 processes data of the video content received from the external device and displays the content image 210. While displaying the content image 210, the display apparatus 100 may detect an event for a switch to the additional service. As an example of this event, a user may make a request for the additional service of displaying time and date information of a region where the display apparatus 100 is currently located.

In response to the event, the display apparatus 100 switches the content image 210 to the service image 220.

The service image 220 shows time and date information corresponding to the current location. In an exemplary embodiment, the content image 210 and the service image 220 are displayed as a full screen on the entire area of the display apparatus 100, where an image is displayable. Thus, a user can get a desired service through the service image 220 displayed on the display apparatus 100.

When the content image 210 is switched to the service image 220, the display apparatus 100 is directly switched between the content image 210 and the service image 220 without a separate visual effect.

Due to a sudden switch from the content image 210 to the service image 220, a user may feel visual fatigue. In particular, the visual fatigue becomes serious when the display apparatus 100 has a large screen size, when the content image 210 and the service image 220 are displayed as full screens, and when motion in the content image 210 is large motion.

Further, a user's viewing experience of the content image 210 is discontinued since the content image 210 is not displayed while the service image 220 is displayed. That is, a user may be unwilling to use the additional service since the visual representation of the content image 210 is discontinued.

Figure 3:
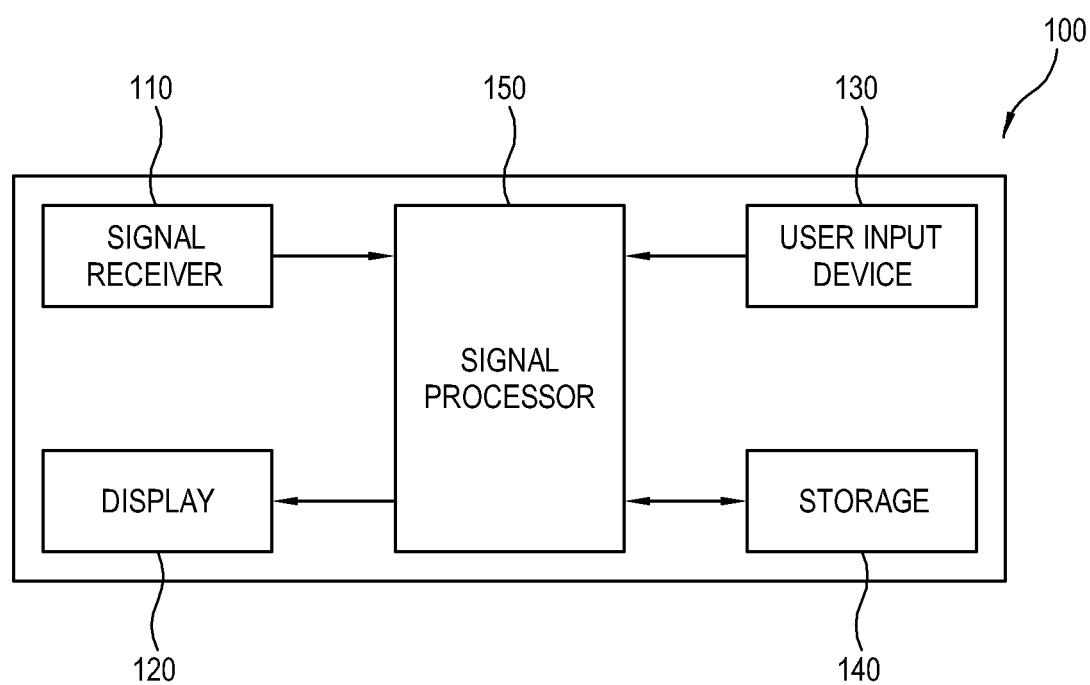
FIG. 3 is a block diagram of a display apparatus according to an exemplary embodiment.

FIG. 3 is a block diagram of a display apparatus 100 according to an exemplary embodiment.

As shown in FIG. 3, the display apparatus 100 includes a signal receiver 110 for receiving a video signal from the external device, a display 120 for displaying an image based on the video signal received in the signal receiver 110, a user input device 130 for receiving a user's input, a storage 140 for storing data and/or information, and a signal processor 150 for processing a video signal to be displayed as an image on the display 120 and controlling operations of the display apparatus 100.

The signal receiver 110 receives a video signal from various video sources 10, 20 and 30 (see FIG. 1). The signal receiver 110 receives a video signal from the external device, and transmits a signal to the external device, thereby performing interactive communication. The signal receiver 110 may include an assembly of communication ports or communication modules respectively corresponding to communication standards, and its supportable protocols and communication targets are not limited to one kind or type. For example, the signal receiver 110 may include a radio frequency integrated circuit (RFIC, not shown) for receiving an RF signal, a wireless fidelity (Wi-Fi) communication module (not shown) for wireless network communication, an Ethernet module (not shown) for wired network communication, a universal serial bus (USB) port for local connection of a USB memory, etc.

The display 120 displays an image based on the video signal processed by the signal processor 150. For example, the display 120 displays a broadcast image based on a tuned broadcast signal output from the signal processor 150. The display 120 may include at least one among liquid crystal, plasma, a light emitting diode, an organic light emitting diode, a surface-conduction electron-emitter, a carbon nanotube, a nano-crystal, etc., without limitation.

Further, the display 120 may include additional elements as well as the display panel in accordance with the types of the panel. For example, if the display 120 includes the liquid crystal, the display 120 includes a liquid crystal display (LCD) panel (not shown), a backlight unit (not shown) for emitting light to the LCD panel, and a panel driver (not shown) for driving the LCD panel.

The user input device 130 transmits various preset control commands or information to the signal processor 150 in accordance with a user's control or input. The user input device 130 transmits various events, which occurs by a user's control in accordance with a user's intention, to the signal processor 150. The user input device 130 may be variously achieved in accordance with information input methods. For example, the user input device 130 may include a key and/or button provided on an outer side of the display apparatus 100, a remote controller separated from a main body of the display apparatus 100, a touch screen formed integrally with the display 120, and an input device provided to communicate with the display apparatus 100.

The storage 140 stores various pieces of data under process and control of the signal processor 150. The storage 140 is accessed by the signal processor 150 and performs reading, writing, editing, deleting, updating or the like with regard to data. The storage 140 includes a flash-memory, a hard-disc drive or the like nonvolatile memory to preserve data regardless of supply of system power in the display apparatus 100.

The signal processor 150 performs various processes with regard to the data and/or signal received in the signal receiver 110. When a video signal is received in the signal receiver 110, the signal processor 150 applies a video processing process to the video signal, and outputs the processed video signal to the display 120, thereby displaying an image on the display 120.

There are no limits to the kind of image processing process performed by the signal processor 150, and the video processing process may for example include demultiplexing for separating a stream into sub streams such as a video signal, an audio signal and additional data, decoding corresponding to video formats of a video stream, de-interlacing for converting a video stream from an interlaced type into a progressive type, scaling for adjusting a video stream to have a preset resolution, noise reduction for improving image quality, detail enhancement, frame refresh rate conversion, etc.

Since the signal processor 150 can perform various processes in accordance with the kinds and characteristics of signal or data, the process performable by the signal processor 150 is not limited to the video processing process. Further, data processible by the signal processor 150 is not limited to only data received in the signal receiver 110. For example, if a user's voice is input to the display apparatus 100, the signal processor 150 may process the voice in accordance with a preset audio processing process. The signal processor 150 includes a system-on-chip (SOC), in which many functions are integrated, or an image processing board (not shown) where individual chip-sets for independently performing the processes are mounted to a printed circuit board.

The display apparatus 100 may have specifically different hardware components in accordance with the types of the display apparatus 100 and the functions supported by the display apparatus 100. For example, a hardware component to be tuned to a certain frequency for receiving a broadcast signal may be included if the display apparatus 100 is a TV, but may be excluded if the display apparatus 100 is a tablet computer.

The signal processor 150 of the display apparatus 100 including the TV is described in detail below.

Figure 4:
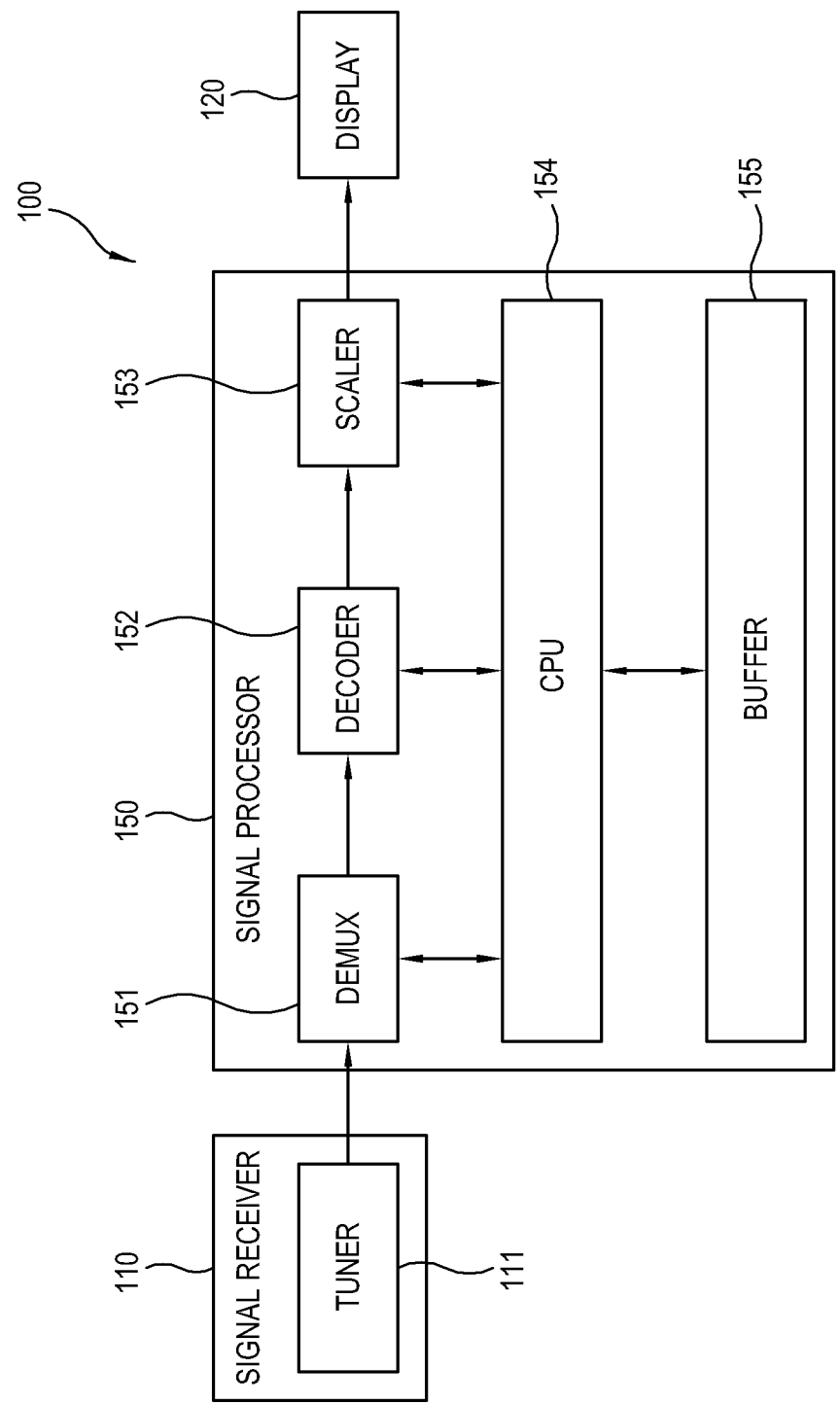
FIG. 4 is a block diagram of a signal processor in the display apparatus of FIG. 3.

FIG. 4 is a block diagram which shows a detail of the signal processor 150 included into the display apparatus 100 that may include more or less elements as compared to the elements described below.

As shown in FIG. 4, the signal receiver 110 includes a tuner 111 to be tuned to a certain frequency to receive a broadcast signal. Further, the signal processor 150 includes a demultiplexer (DEMUX) 151 for dividing the broadcast signal received from the tuner 110 into a plurality of sub signals, a decoder 152 for decoding the plurality of sub signals output from the DEMUX 151, a scaler 153 for scaling a video signal among the decoded sub signals and outputting it to the display 120, a central processing unit (CPU) 154 for performing calculation and control for the operations of the signal processor 150, and a buffer 155 for temporarily storing a signal or data while the signal or data is being processed by the signal processor 150.

When a broadcast signal is received in an RF antenna (not shown), the tuner 111 is tuned to a frequency of a designated channel to receive a broadcast signal and converts the broadcast signal into a transport stream. The tuner 111 converts a high frequency of a carrier wave received via the antenna (not shown) into an intermediate frequency band and converts it into a digital signal, thereby generating a transport stream. To this end, the tuner 111 has an analog/digital (A/D) converter (not shown). As another example, the A/D converter may be included in a demodulator (not shown).

The DEMUX 151 performs a reverse operation of the multiplexer (not shown). That is, the DEMUX 151 connects one input terminal with a plurality of output terminals, and distributes a stream input to the input terminal to the respective output terminals in accordance with selection signals. For example, if there are four output terminals with respect to one input terminal, the DEMUX 151 may select each of the four output terminals by combination of selection signals having two levels of 0 and 1.

In the display apparatus 100, the DEMUX 151 divides the transport stream received from the tuner 311 into the sub signals of a video stream, an audio stream and an additional data stream and outputs them to the respective output terminals.

The DEMUX 151 may use various methods to divide the transport stream into the sub signals. For example, the DEMUX 151 divides the transport stream into the sub signals in accordance with packet identifiers (PID) provided to packets in the transport stream. The sub signals in the transport stream are independently compressed and packetized according to channels, and the same PID is provided to the packets corresponding to one channel so as to be distinguished from the packets corresponding to another channel. The DEMUX 151 classifies the packets in the transport stream according to the PID, and extracts the sub signals having the same PID.

The decoder 152 decodes each of the sub signals output from the DEMUX 151. FIG. 4 shows a single decoder 152, but not limited thereto. As another example, a plurality of decoders may be provided to respectively decode the sub signals. That is, the decoder 152 may include a video decoder for decoding a video signal, an audio decoder for decoding an audio signal, and an additional data decoder for decoding additional data.

Since the sub signal transmitted to the decoder 152 is encoded by a certain format, the decoder 152 performs a reverse operation to the encoding process and thus restores the sub signal to an original signal before encoding. If the sub signal output from the DEMUX 151 is not encoded, e.g., not compressed, the decoder 152 transmits this sub signal to the scaler 153 without processing it or the sub signal bypasses the decoder 152 and is thus sent to the scaler 153.

The scaler 153 scales the video signal decoded by the decoder 152 to have a resolution suitable for the display 120 or a differently designated resolution. Thus, the video signal subject to the scaling is displayed as an image on the display 120.

The CPU 154 is an element for performing central calculation to operate elements in the signal processor 150, and plays a central role in parsing and calculating data. The CPU 154 internally includes a processor register (not shown) in which commands to be processed are stored; an arithmetic logic unit (ALU) (not shown) being in charge of comparison, determination and calculation; a control unit (not shown) for internally controlling the CPU 154 to analyze and carry out the commands; an internal bus (not shown), a cache (not shown), etc.

The CPU 154 performs calculation needed for operating the elements of the signal processor 150, such as the DEMUX 151, the decoder 152 and the scaler 153. As another example, some elements of the signal processor 150 may be designed to operate without the data calculation of the CPU 154 or operate by a separate microcontroller (not shown).

The buffer 155 temporarily stores data to be processed by the respective elements of the signal processor 150 when the signal processor 150 processes a broadcast signal. On the contrary to the storage 140 (see FIG. 4) required to keep data even though the system is powered off, the buffer 155 includes a volatile memory since data is temporarily loaded therein during the signal processing processes. In FIG. 4, the input/output of the buffer 155 is connected to the CPU 154, but not limited thereto. As another example, the elements of the signal processor 150 may be directly connected to the buffer 155 without passing through the CPU 154.

The display apparatus 100 processes received video content and displays an image based on the processed video content. Further, the display apparatus 100 displays an image based on an additional service instead of the image based on the video content when receiving a command for executing the additional service from the user input device 130 while the image based on the video content is displayed on the display 120.

The display apparatus 100 which generates a background image, e.g., a second image, for the content image, e.g., a first image, based on the additional service according to an exemplary embodiment is described in detail below.

FIGS. 5 to 13 illustrate an example of generating a background image for an image of an additional service in the display apparatus 100 according to an exemplary embodiment. In the following descriptions, an image based on a video signal corresponding to the video content will be called a content image or a first image, and an image corresponding to the additional service will be called a service image.

While the service image including the background image generated according to the exemplary embodiments is displayed, the display apparatus 100 does not display the content image but continues to process the video content.

Figure 5:
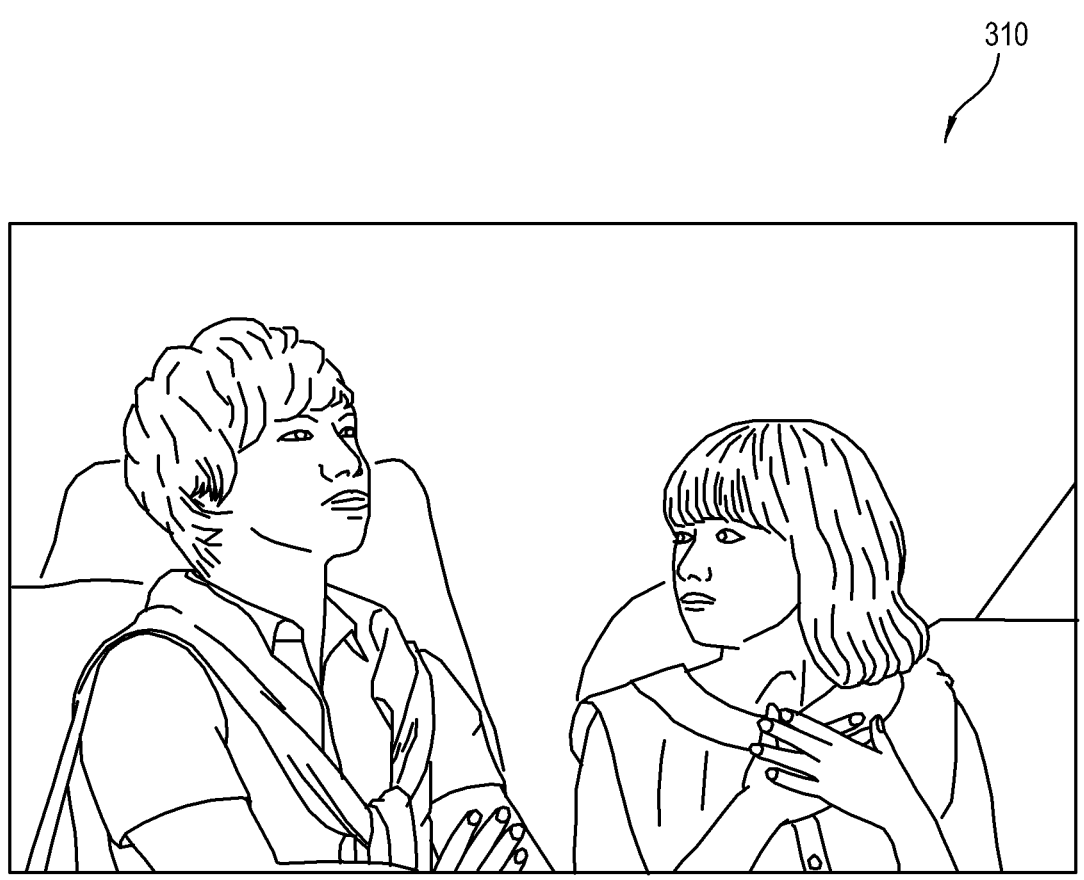
FIGS. 5, 6, 7, 8, 9, 10, 11, 12, and 13 illustrate an example of generating a background image for an image of an additional service in the display apparatus of FIG. 3.

As shown in FIG. 5, the display apparatus 100 captures a certain image frame 310 of the content image when an event of instructing execution of the additional service occurs while displaying the content image. These processes are operated and performed by the CPU 154 (see FIG. 4), but a separate element for implementing these processes may be provided in the display apparatus 100.

Further, data generated in the following processes as well as the captured image frame 310 is stored in the buffer 155 (see FIG. 4).

Figure 6:
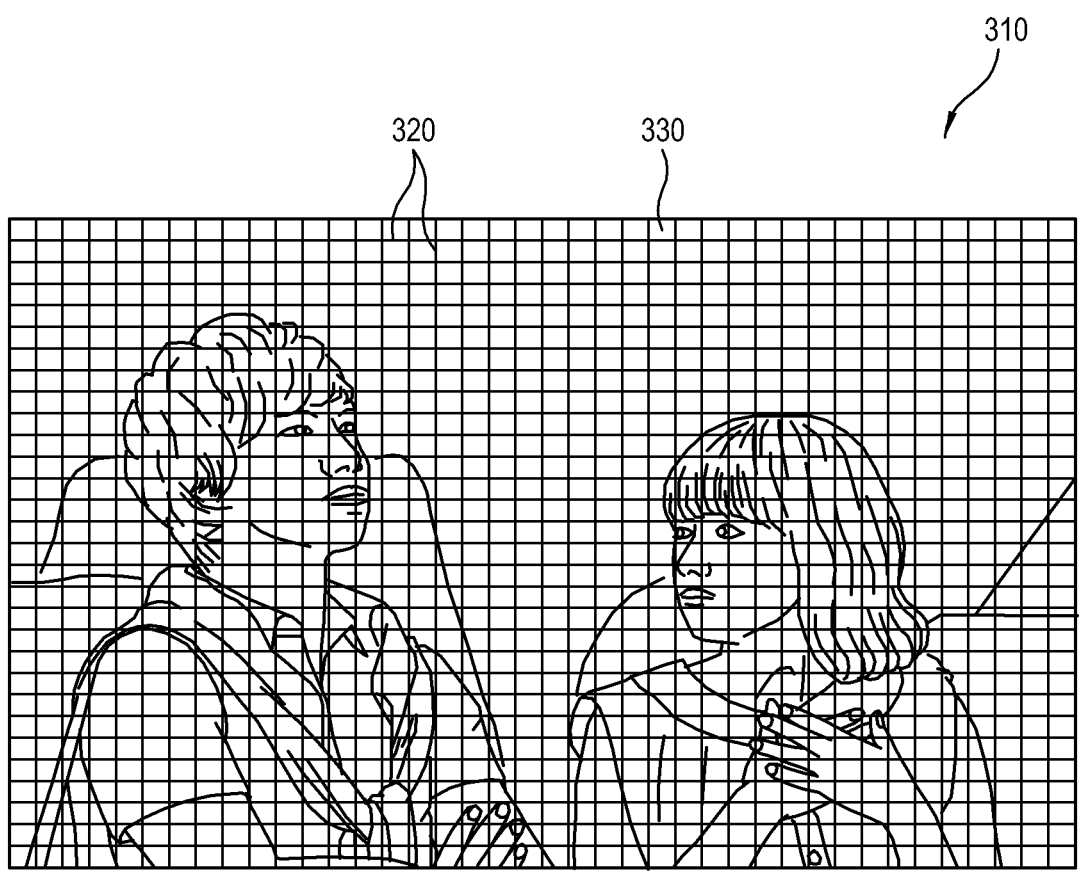

As shown in FIG. 6, the display apparatus 100 divides the image frame 310 captured from the content image into grids 320 in a matrix form of M*N. Here, M and N are preset numerical values, and may vary depending on the resolutions of the image frame 310.

By the grids 320, the image frame 310 is divided into a plurality of quadrangles 330. Further, each quadrangle 330 includes a plurality of pixels.

Figure 7:
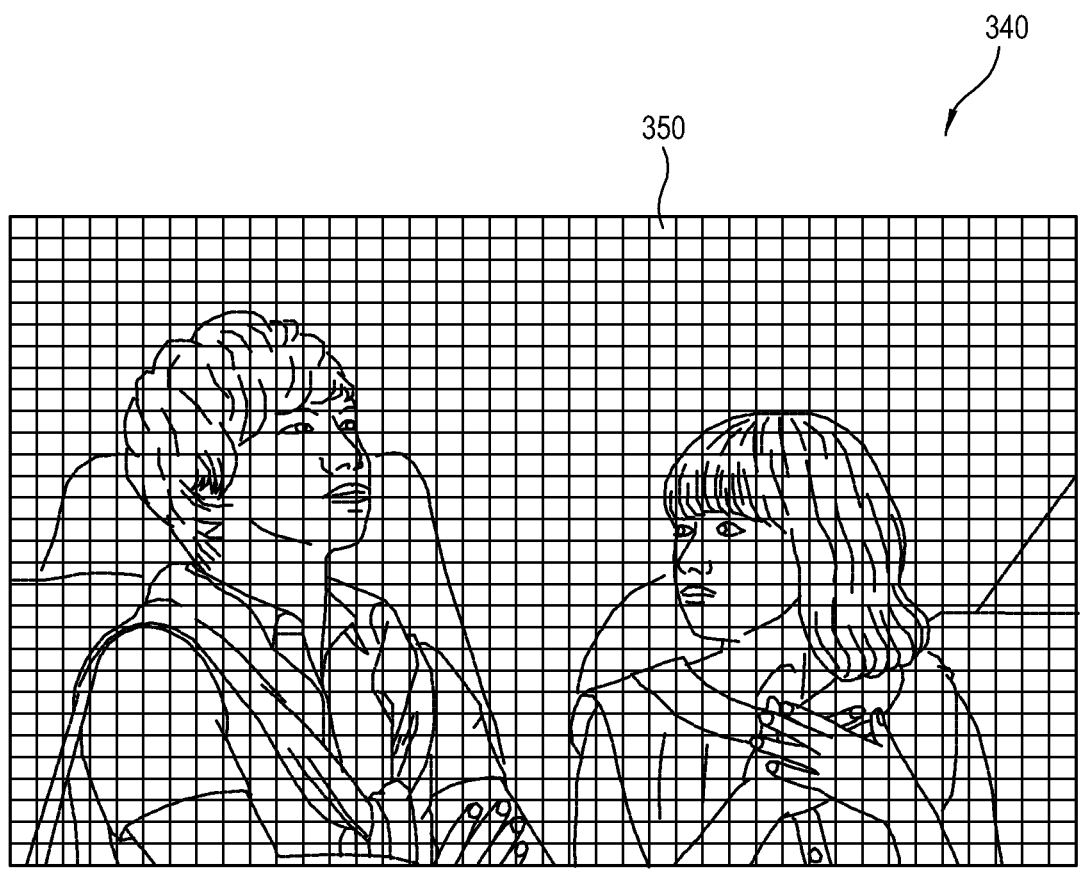

As shown in FIG. 7, the display apparatus 100 extracts and stores RGB values of each pixel included in each quadrangle 350. Further, the display apparatus 100 converts all the image frames 340 into frames represented in grayscale.

Figure 8:
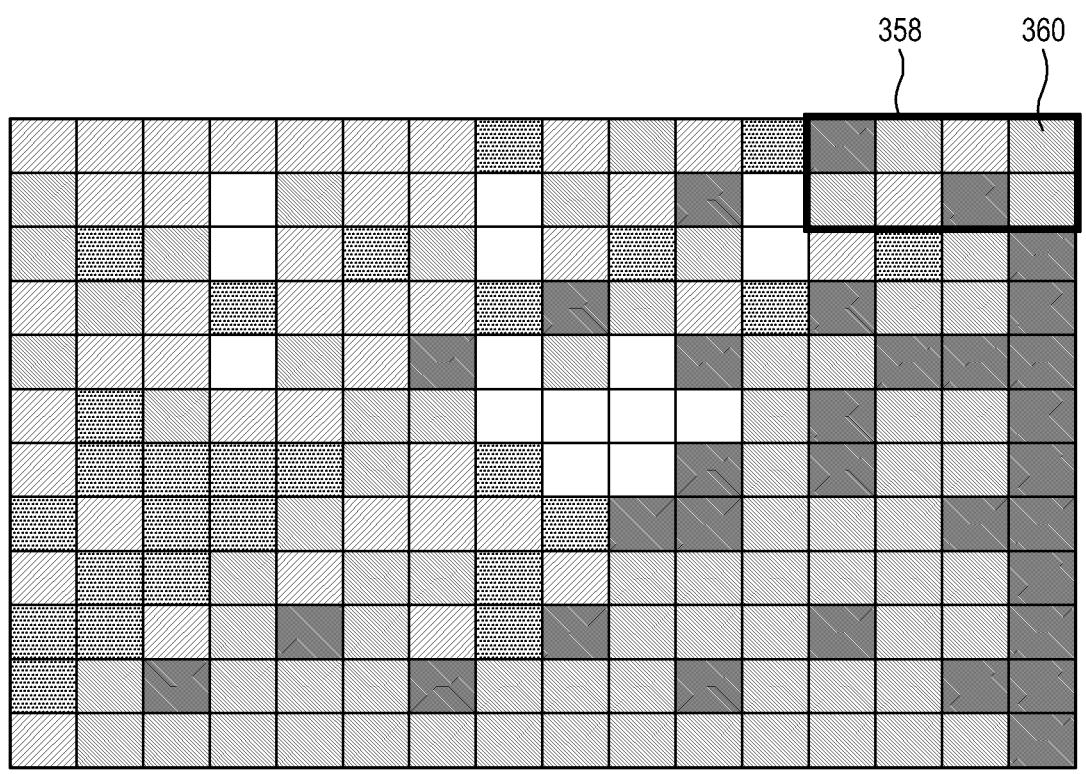

As shown in FIG. 8, the display apparatus 100 calculates brightness and transparency based on the RGB values extracted and stored according to the respective quadrangles 350 (see FIG. 7). The display apparatus 100 reflects the calculated brightness and transparency to the corresponding quadrangle 360. FIG. 8 illustrates a partial area of the display apparatus 100 for easy understanding.

Here, the brightness Br and the transparency a of the quadrangle 360 are calculated based on the RGB values of the pixel of each quadrangle 360, as follows.

$$Br = \mathrm{sqrt}(r^2*0.241 + g^2*0.691 + b^2*0.068); (0 < Br < 255)$$

$$\alpha = 1 - Br/255; (0 < \alpha < 1) \quad \text{[Equation 1]}$$

where variables r, g and b are an average value of R values, an average value of G values and an average value of B values of the pixels in each quadrangle 360, and sqrt is a function of returning a square root of a provided numerical value.

Figure 9:
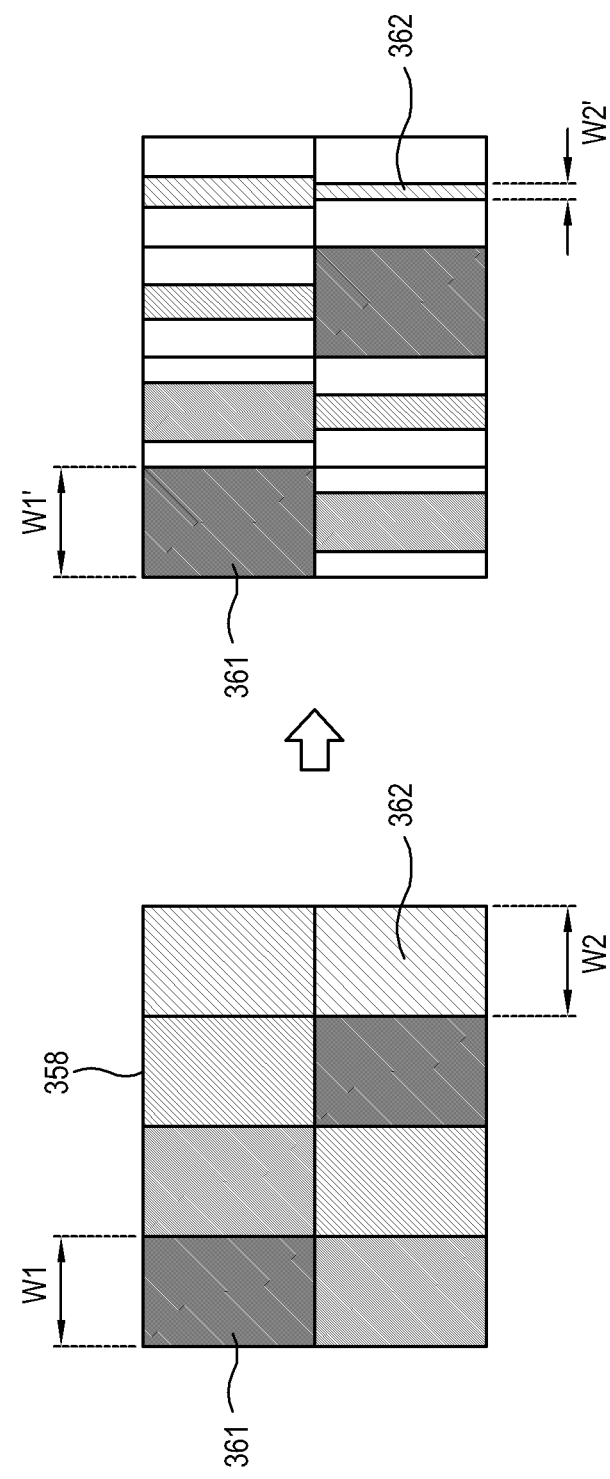

As shown in FIG. 9, the display apparatus 100 adjusts each width of the quadrangles 361 and 362 of a portion 358 of a screen based on the brightness calculated according to the quadrangles 361 and 362. The display apparatus 100 does not adjust a height of the quadrangles 361 and 362.

The display apparatus 100 determines each width w of the quadrangles 361 and 362 by the following equation.

$$w = 1 - Br/255 \quad \text{[Equation 2]}$$

If the maximum value of w is 1, w has a range of 0<w<1. Referring to Equation 2, the widths of the quadrangles 361 and 362 become smaller as the brightness increases, and become larger as the brightness decreases.

For comparison, let a first quadrangle 361 have relatively low brightness and a second quadrangle 362 have relatively high brightness. Before adjusting the widths, the width w1 of the first quadrangle 361 is equal to the width w2 of the second quadrangle 362.

Based on the foregoing equations, the width of the first quadrangle 361 is changed from w1 to w1' and the width of the second quadrangle 362 is changed from w2 to w2', in which the width w1' is larger than the width w2'. That is, with the higher brightness, the width becomes smaller.

Figure 10:
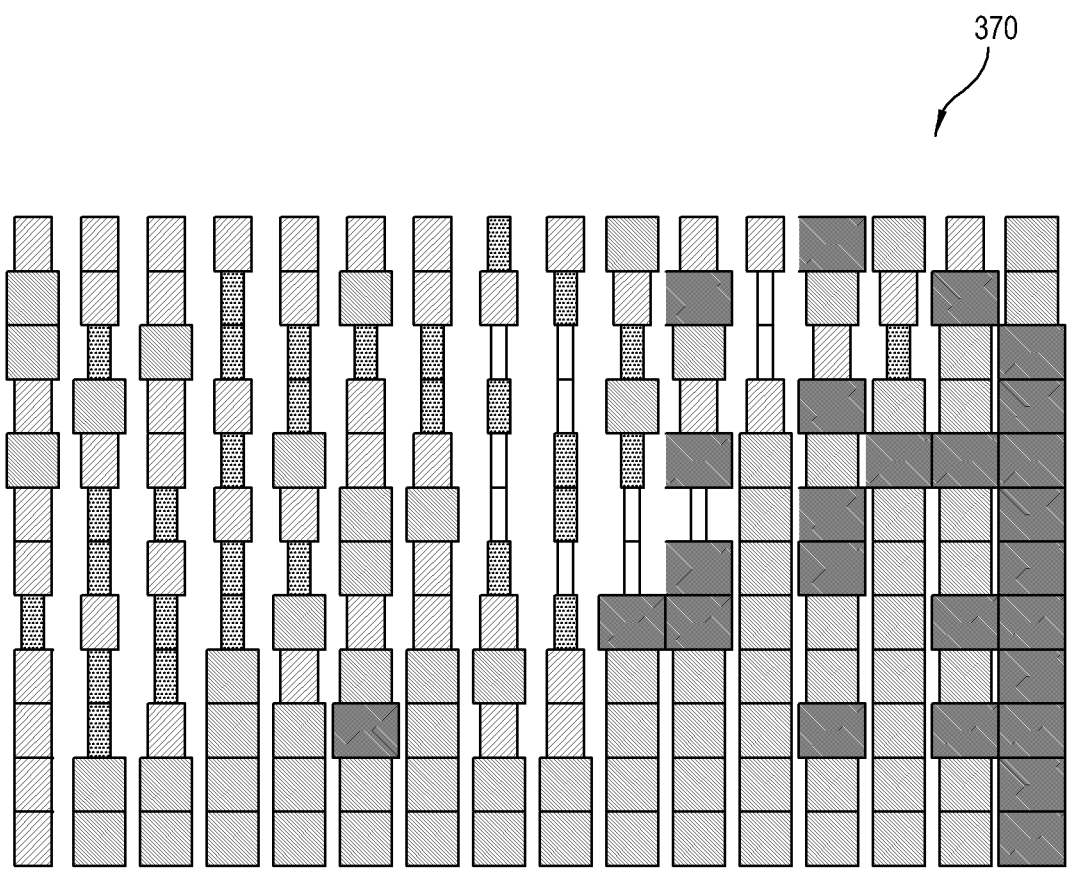

As shown in FIG. 10, if the foregoing adjustment is applied to all the quadrangles in the image frame 370, the quadrangles of the image frame 370 have the same height but different widths according to the brightness. Specifically, the quadrangle having the relatively low brightness has a relatively wide width, but the quadrangle having the relatively high brightness has a relatively narrow width.

Figure 11:
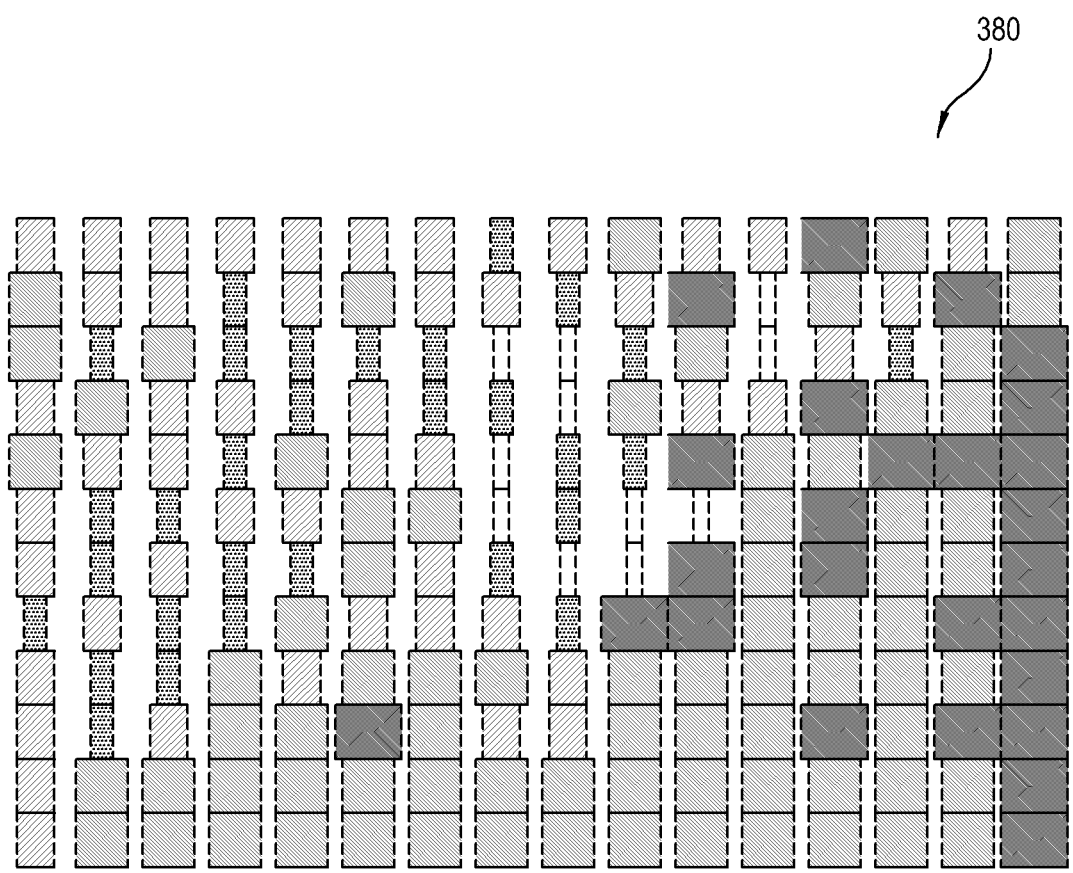

As shown in FIG. 11, the display apparatus 100 applies a blur process to only vertical lines of each quadrangle in the image frame 380. The blur process applied to only the vertical lines of the quadrangle means that a blur process is applied to not the top and bottom edges of the quadrangle but the left and right edges of the quadrangle.

The blur process, i.e., blurring refers to a technique for blurring or softening an image by removing a detailed part of the image. Here, the detailed part of the image corresponds to a part where an image is suddenly changed in units of pixel, i.e., an edge of an object in the image. If the image is represented in a frequency domain, an edge part of the object corresponds to a high frequency component. In the blurring, such a high frequency component is filtered out, and therefore the edge part of the object is blurred in the image. For example, the blurring may include low-pass filtering.

In an exemplary embodiment, various techniques may be used for the blurring. For example, Gaussian blurring may be applied to the image frame 380. Gaussian blurring is a kind of an image blurring filter using the Gaussian function. The one-dimensional (1D) Gaussian function is as follows.

$$G(x) = \frac{1}{\sqrt{2\pi\sigma^2}} e^{-\frac{x^2}{2\sigma^2}} \quad \text{[Equation 3]}$$

The two-dimensional (2D) Gaussian function is as follows.

$$G(x, y) = \frac{1}{\sqrt{2\pi\sigma^2}} e^{-\frac{x^2+y^2}{2\sigma^2}} \quad \text{[Equation 4]}$$

where x is a distance from the origin in a horizontal axis, y is a distance from the origin in a vertical axis, and σ is a standard deviation of Gaussian distribution.

The display apparatus 100 repeats the foregoing processes while the service image is displayed. These processes are performed in real time as many as a preset number of times per second with regard to the content image reproduced in the background. That is, the display apparatus 100 captures the image frame in real time from the content image, which is reproduced but not displayed, and applies the foregoing processes to the captured image frame, thereby displaying a background image for the service image.

The number of times for performing the processes per second by the display apparatus 100 may be variously determined in a design stage. For example, the processes may be performed by 15 frames per second (fps), i.e., 15 times per second.

Figure 12:
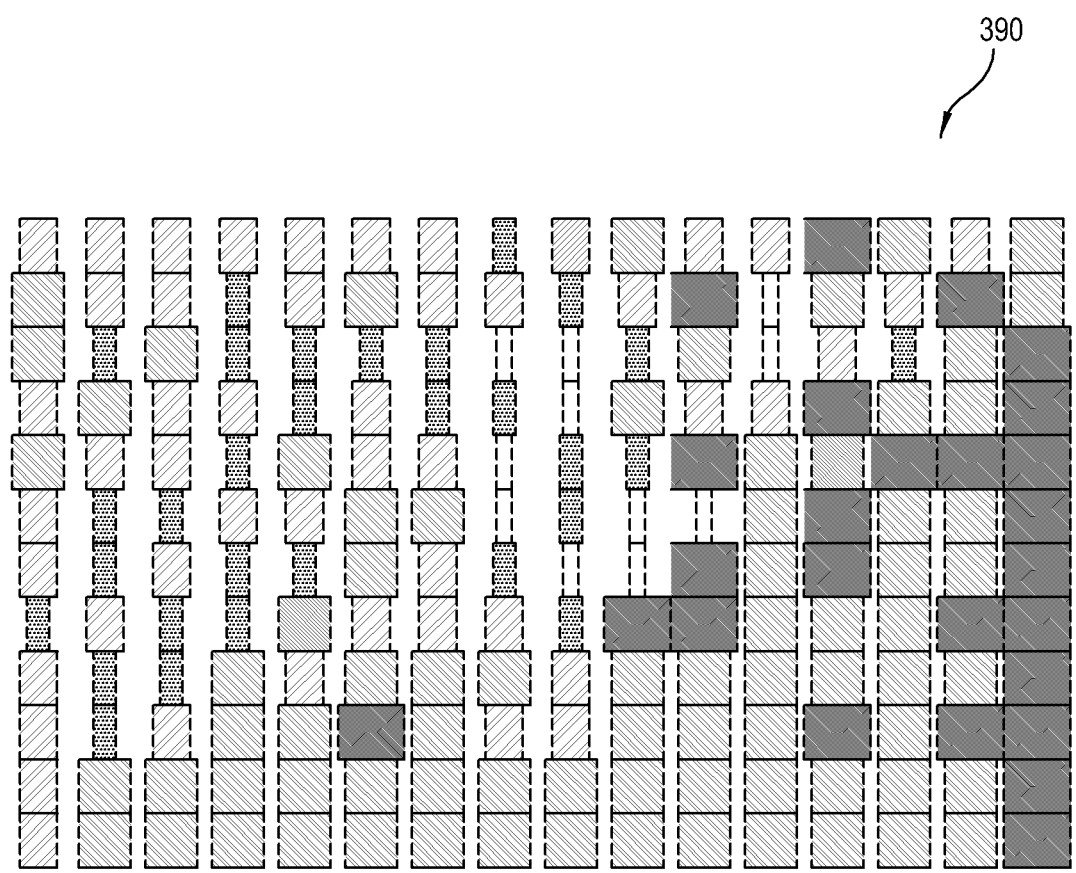

As shown in FIG. 12, the display apparatus 100 sequentially changes the RGB values of each quadrangle in units of process while repeating the processes, so that the background image 390 can have a preset color.

This changing method will be described by an example of changing one block quadrangle into orange one. The block quadrangle has RGB values of (0, 0, 0) and the orange quadrangle has RGB values of (152, 83, 44). Therefore, if there is a quadrangle having RGB values of (0, 0, 0) in the first process, the display apparatus 100 increases the RGB values by 1 at every process until the RGB values of the corresponding quadrangle reaches the RGB values of e (152,83,44).

For example, the RGB values of the corresponding quadrangle are changed like (0,0,0)→(1,1,1)→(2,2,2)→ . . . →(44,44,44)→ . . . →(83,83,44)→ . . . →(152,83,44) whenever the process is repeated. If a certain value among the RGB values first reaches the target value, the display apparatus 100 fixes the reached value but continues to change the other values in units of process.

On the other hand, if the quadrangle has RGB values of (255,255,255), the display apparatus 100 decreases the RGB values by 1 at every process until the RGB values of the corresponding quadrangle reaches the RGB values of e (152,83,44).

Further, the display apparatus 100 may increase a blurring value, which is reflected to the corresponding image frame whenever the processes are repeated, from 1 to a preset value, e.g., to 20 by 1 in each process. The higher the blurring value, the more the blurring effect. The display apparatus 100 increases a weight of blurring whenever the process is repeated.

Figure 13:
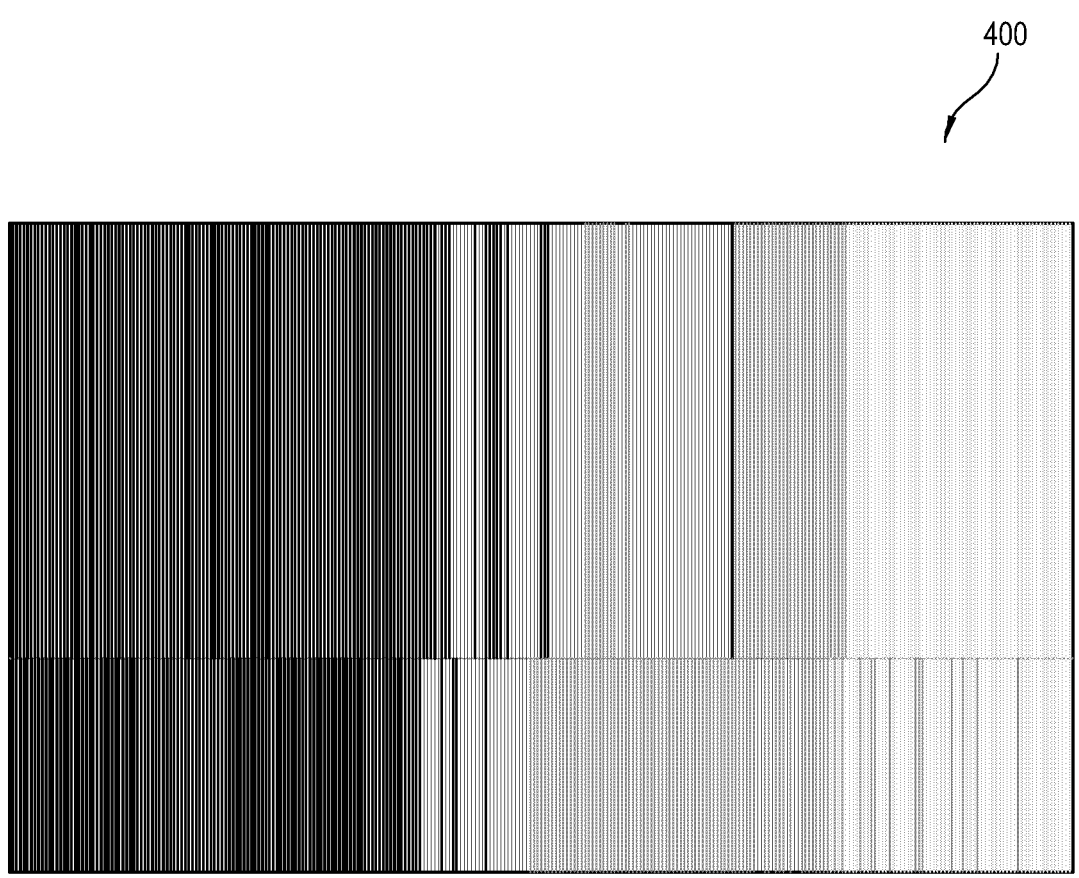

As shown in FIG. 13, as the process is repeated in units of image frame, a boundary between the quadrangles vertically adjacent to each other in the image frame disappears and looks like a line. Thus, the content image gradually becomes abstract, and thus serves as a background image 400 based on a certain color of the service image.

The background image 400 is varied in real time depending on the reproduction of the content image while the service image is displayed, and therefore lines in the background image 400 are displayed being continuously varied like waves. The real-time variation in the background image 400 corresponds to change in the image frame of the content image. Therefore, while the service image is displayed and the content image is not displayed, a user can continuously receive a visual feedback corresponding to the content image. Further, it is possible to reduce visual fatigue due to sudden change of an image when the content image is switched to the service image or when the service image is switched again to the content image.

The display apparatus 100 which displays a service image according to an exemplary embodiment is described in detail below.

Figure 14:
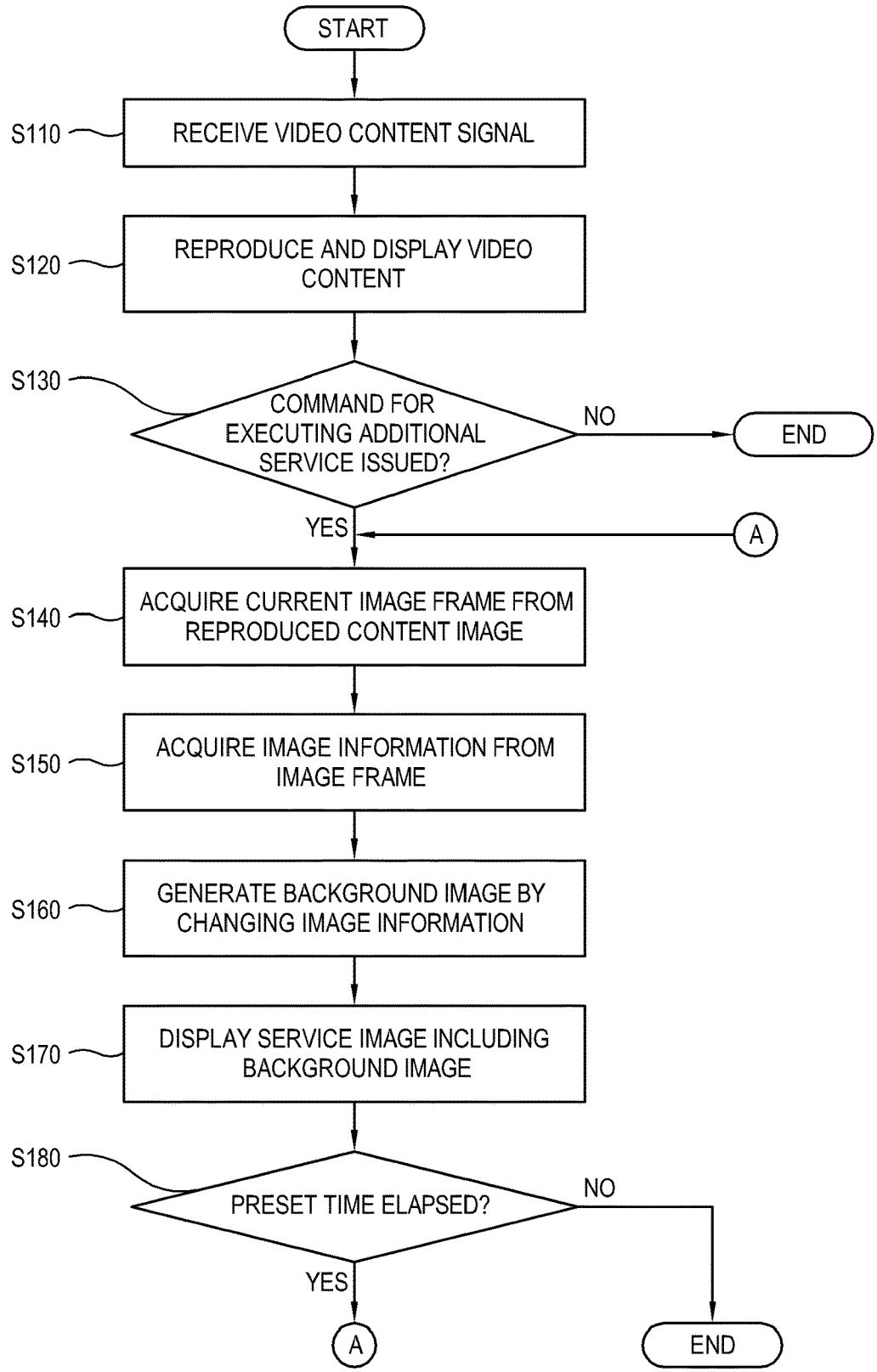
FIG. 14 is a flowchart of displaying a service image in the display apparatus of FIG. 3.

FIG. 14 is a flowchart of displaying a service image in the display apparatus 100.

As shown in FIG. 14, at operation S110, the display apparatus 100 receives a video content signal, and, at operation S120, the display apparatus 100 processes the video content signal to reproduce and display a content image.

At operation S130, the display apparatus 100 determines whether there is a command issued to execute an additional service.

If it is determined that a command is issued to execute the additional service, at operation S140, the display apparatus 100 acquires an image frame at the current time from content image. At operation S150, the display apparatus 100 acquires preset image information from the image frame. At operation S160, the display apparatus 100 changes the image information in accordance with a preset algorithm and thus generates the background image. At operation S170, the display apparatus displays the service image including the background image.

At operation S180, the display apparatus 100 determines whether a preset time elapses after displaying the service image.

If it is determined that a preset time elapses after displaying the service image, the display apparatus 100 returns to the operation S140 and repeats the process of generating the background image.

Thus, the background image for the service image is varied depending on image information of the reproduced content image as time passes.

The display apparatus 100 which generates the background image for the service image according to an exemplary embodiment is described in detail below.

Figure 15:
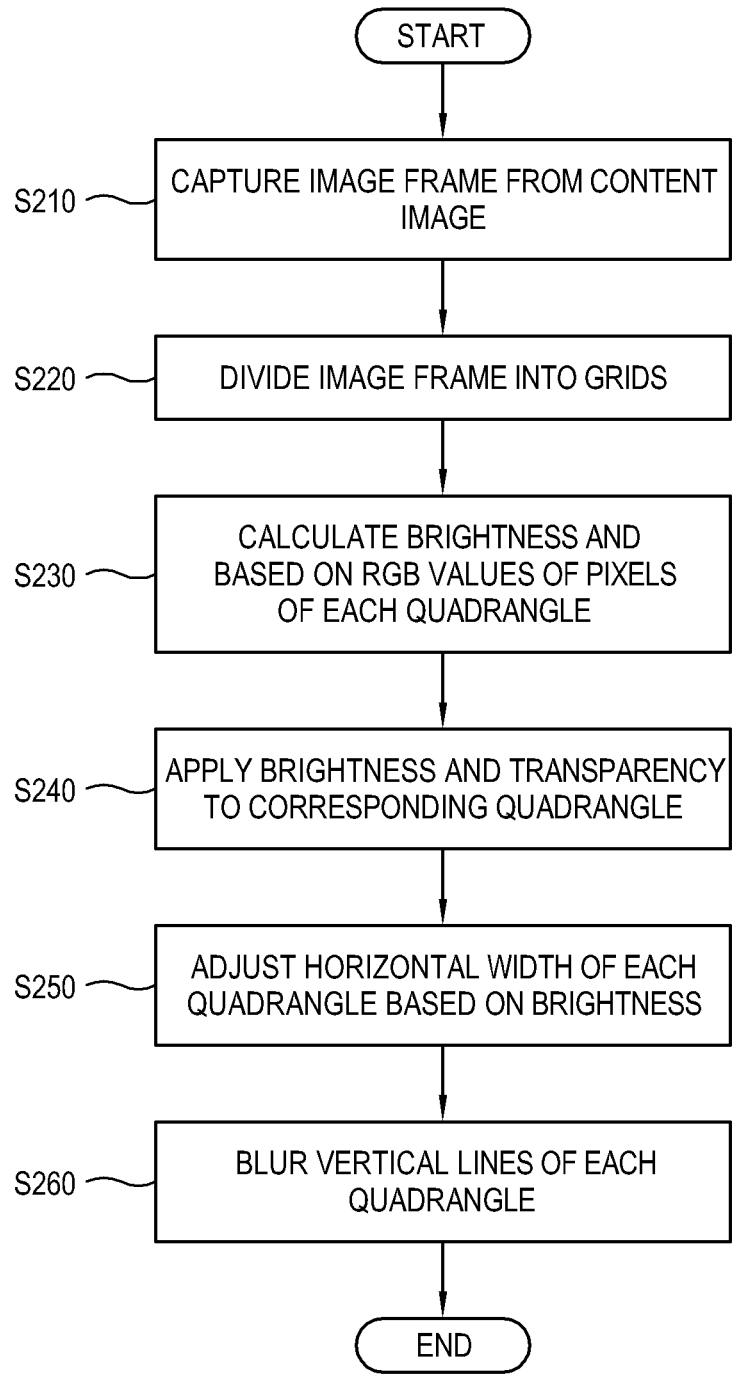
FIG. 15 is a flowchart of generating a background image for the service image in the display apparatus of FIG. 3.

FIG. 15 is a flowchart of generating a background image for the service image in the display apparatus 100.

As shown in FIG. 15, at operation S210 the display apparatus 100 captures an image frame from a content image.

At operation S220, the display apparatus 100 divides the image frame into grids including a preset number of quadrangles.

At operation S230, the display apparatus 100 calculates brightness and transparency based on RGB values of a pixel included in each quadrangle.

At operation S240, the display apparatus 100 applies the calculated brightness and transparency to the corresponding quadrangle.

At operation S250, the display apparatus 100 adjusts the horizontal width of each quadrangle based on the brightness.

At operation S260, the display apparatus 100 performs the blurring with regard to the vertical lines of each quadrangle.

The display apparatus 100 performs the foregoing processes in real time while the service image is displayed. As the processes are repeated, the display apparatus 100 changes the RGB values of each quadrangle to approximate to RGB values of a preset color and also increases the blurring value up to a preset value. Thus, the display apparatus 100 can display the background image for the service image which is varied depending on the image information of the reproduced content image.

For example, if the content image, e.g., the first image, includes one or more objects, the background image, e.g., the second image, for the service image is displayed as an image corresponding to a part of the image information of the object, for example, corresponding to an outline of the object.

The additional service using the background image which is generated according to an exemplary embodiment is described in detail below.

A user may control the user input device 130 (see FIG. 3) to move a cursor displayed on the display apparatus 100 or move a GUI displayed on the display apparatus 100 in a certain direction. In this case, a user can intuitively and easily recognize the certain direction with respect to up, down, left and right directions, i.e., four directions. If the cursor moves from the origin in a certain direction, it is possible to two-dimensionally represent this direction, i.e., on a horizontal axis and a vertical axis. Accordingly, it is easy for a user to recognize the two-dimensionally moving direction with respect to left and right directions corresponding to the horizontal direction and up and down directions corresponding to the vertical direction.

In this regard, the user input device 130 (see FIG. 4) provides a user with input environments for issuing a command about movement in four directions.

Figure 16:
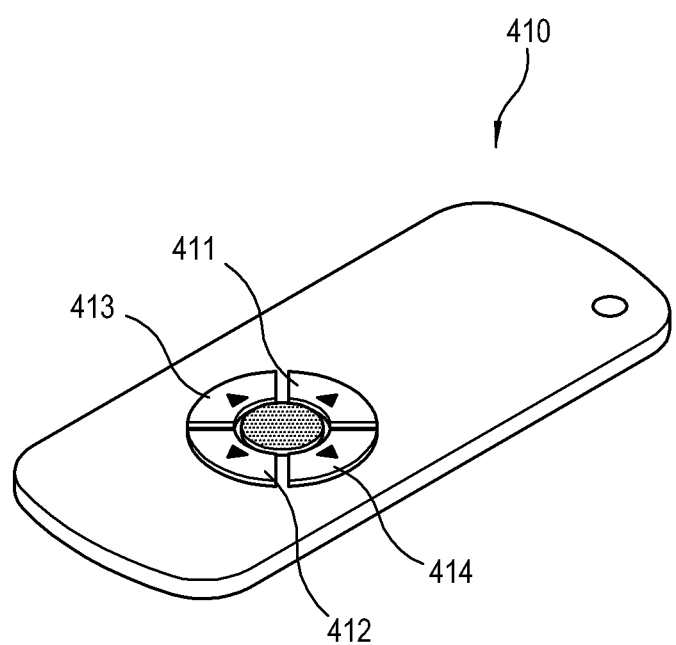
FIG. 16 illustrates an example of a user input according to an exemplary embodiment.

FIG. 16 illustrates an example of a user input device 410 according to an exemplary embodiment.

As shown in FIG. 16, the user input device 410 includes a remote controller easily carried by a user. The user input device 410 includes an up arrow key 411, a down arrow key 412, a left arrow key 413 and a right arrow key 414 respectively corresponding to the four directions. The respective arrow keys 411, 412, 413 and 414 are physically or mechanically separated from one another. If a user presses one of them, a command about movement in a direction corresponding to the pressed arrow key is issued in the user input device 410.

The command issued in the user input device 410 is transmitted to the display apparatus.

Figure 17:
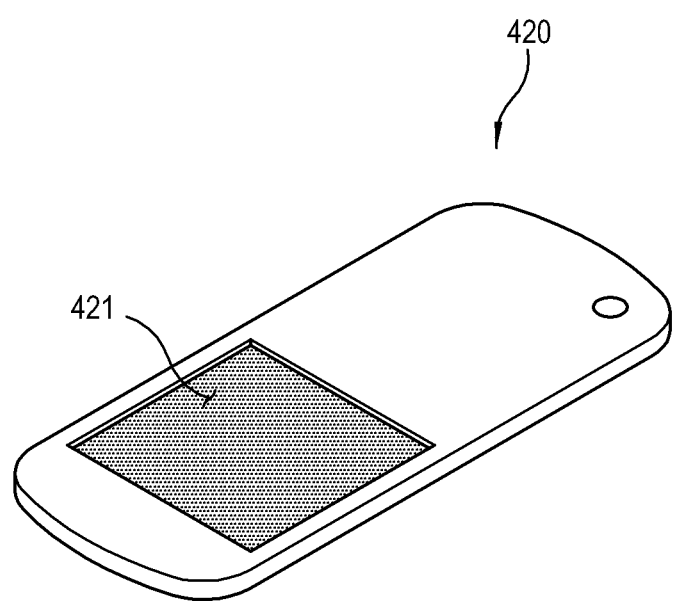
FIG. 17 illustrates an example of a user input according to an exemplary embodiment.

FIG. 17 illustrates an example of a user input device 420 according to an exemplary embodiment.

As shown in FIG. 17, the user input device 420 includes a touch pad 421 for touch input using a user's finger, a stylus pen (not shown), etc. Although a user can make an input by a dragging operation in various directions through the 2D touch pad 421, the most exact directions a user can input are the most intuitive up, down, left and right, i.e., four directions.

As another example, the user input device 420 may have a built-in motion sensor (not shown) for sensing its own motion, so that a user can issue a command corresponding to a direction in which the user input device 420 is shaken or moved.

Since a user can most intuitively recognize the up, down, left and right, i.e., four directions and make a corresponding input, mapping based on the categories of the additional service displayed on the display apparatus is provided corresponding to the up, down, left and right, i.e., four directions for user's convenience.

Figure 18:
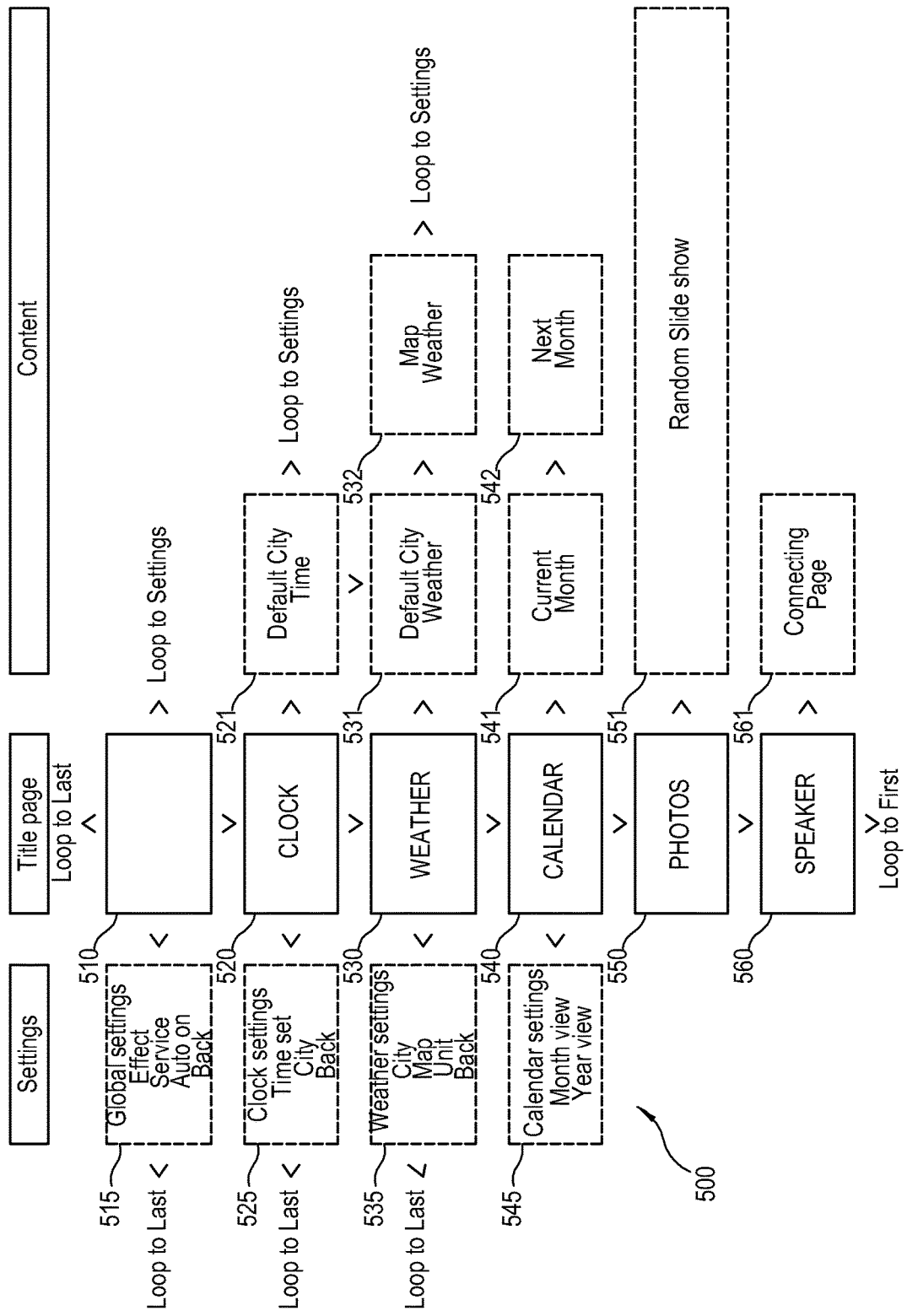
FIG. 18 illustrates content mapping for an additional service image according to an exemplary embodiment.

FIG. 18 illustrates content mapping for an additional service image according to an exemplary embodiment.

As shown in FIG. 18, an additional service 500 includes categories such as 'CLOCK' for showing the current time, 'WEATHER' for showing weather in the current region, 'CALENDAR' for showing today's date, 'PHOTOS' for showing an image such as a photograph, a picture, etc., 'SPEAKER' for activating a loudspeaker installed in the display apparatus, etc. These categories are provided as an example, and do not limit the exemplary embodiments.

The boxes shown in FIG. 18 are the service images to be displayed on the display apparatus. The horizontal lines refer to the category of the additional service, and the vertical lines refer to the functions of the service image.

The service images 510 and 515 on the first horizontal line correspond to initial categories for first initiating the additional service. The service images 520, 521 and 525 on the second horizontal line correspond to 'CLOCK' categories. The service images 530, 531, 532 and 535 on the third horizontal line correspond to WEATHER categories. The service images 540, 541, 542 and 545 on the fourth horizontal line correspond to 'CALENDAR' categories. The service images 550 and 551 on the fifth horizontal line correspond to 'PHOTOS' categories. The service images 560 and 561 on the sixth horizontal line correspond to 'SPEAKER' categories.

'Settings' corresponds to setting images 515, 525, 535 and 545 for setting the display environments of the respective categories. 'Title page' corresponds to title images 510, 520, 530, 540, 550 and 560 for respectively initiating the services of the categories. 'Content' corresponds to images 521, 531, 532, 541, 542, 551 and 561 containing actual information for providing the services of the respective categories.

These service images are applied with the background image according to the exemplary embodiments. Of course, all, some, or only one of the service images may have the background images, e.g., the second images, according to an exemplary embodiment. As another example, certain images such as the title images 510, 520, 530, 540, 550 and 560 in the categories may have the background images according to an exemplary embodiment. However, the background images of the categories are displayed with different colors in order to distinguish among the categories.

Further, the arrows around the service image indicate what service image the corresponding service image will be switched to, if a user issues a command for moving in one of the up, down, left and right, i.e., four directions while the corresponding service image is displayed on the display apparatus. 'Loop to First' refers to switching to the first service image on the corresponding line, 'Loop to Last' refers to switching to the last service image on the corresponding line, and 'Loop to Settings' refer to switching to the settings for the corresponding horizontal line.

For example, the content image is switched to the initial title image 510 in response to an operation of first initiating the additional service. In this state, if a user issues a command for movement in the left direction or right direction, the setting image 515 for adjusting the settings applied to, for example, all of the additional services is displayed. On the other, if a user issues a command for movement in the down direction, the title image 520 corresponding to the 'CLOCK' category is displayed.

In the state that the title image 520 corresponding to the 'CLOCK' category is displayed, if a user issues a command for movement in the right direction, the content image 521 corresponding the 'CLOCK' category is displayed showing the current time. On the other hand, if a user issues a command for movement in the down direction, the title image 530 corresponding to the 'WEATHER' category is displayed.

If a command for executing the additional service is issued while the content image is displayed on the display apparatus, the display apparatus first displays the initial image 510 for initiating the additional service, and switches the service images in response to a user's command on the direction.

Further, if an execution command is issued with regard to a certain category in the state that execution commands are previously provided for the display of the respective categories corresponding to the additional services, the display apparatus may first one of the display the title images 520, 530, 540, 550 or 560 of the corresponding category.

Figure 19:
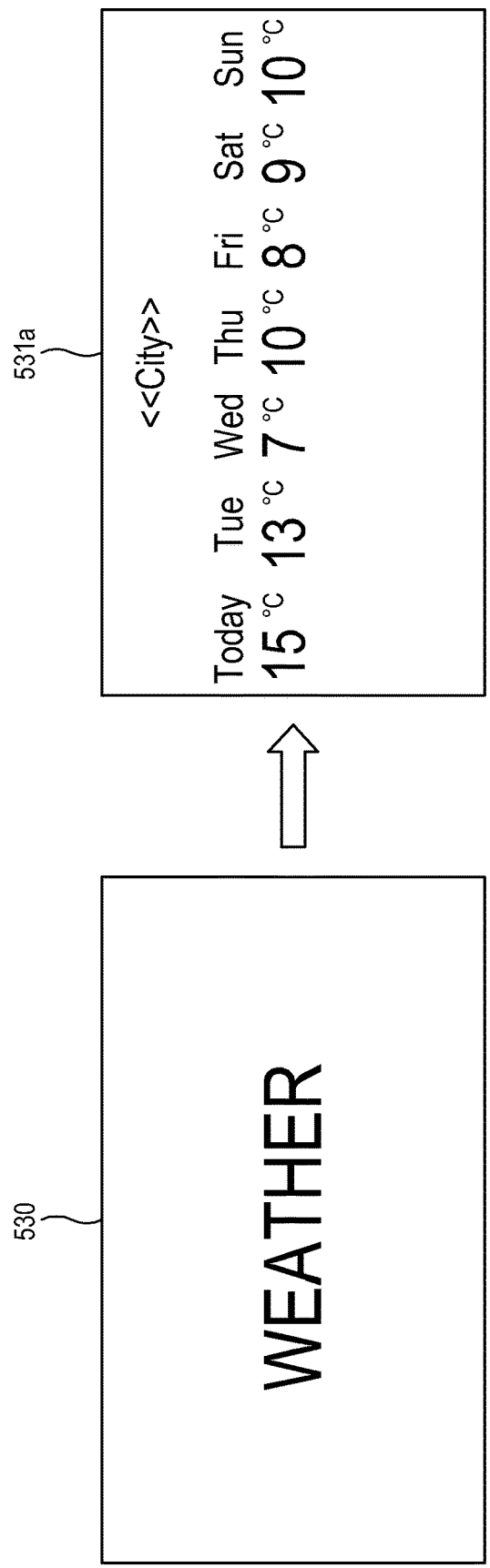
FIG. 19 illustrates switching a title image corresponding to a certain category of an additional service to a content image in a display apparatus according to an exemplary embodiment.

FIG. 19 illustrates switching a title image 530 corresponding to a certain category of an additional service to a content image 531*a* in a display apparatus according to an exemplary embodiment.

As shown in FIG. 19, if the title image 530 corresponding to the 'WEATHER' category is initiated in response to a user's command, the display apparatus displays a weather information image 531*a* in accordance with one of two methods, but the category, i.e., 'WEATHER,' and the methods described are not limiting.

One of two methods is to automatically display the weather information image 531*a* after a preset time elapses from when the title image 530 is displayed, even though there are no user's inputs in the state that the display apparatus displays the title image 530. The preset time may have various numerical values. For example, the display apparatus displays the weather information image 531*a* after 1 second elapses from when the title image 530 is displayed.

The other method is to display the weather information image 531*a* in response to a user's command of the right direction, but this is not limiting. As described with the foregoing map shown in FIG. 18, the weather information image 531*a* is mapped to the right direction of the title image 530, and therefore the display apparatus displays the switched service image based on the corresponding map.

Figure 20:
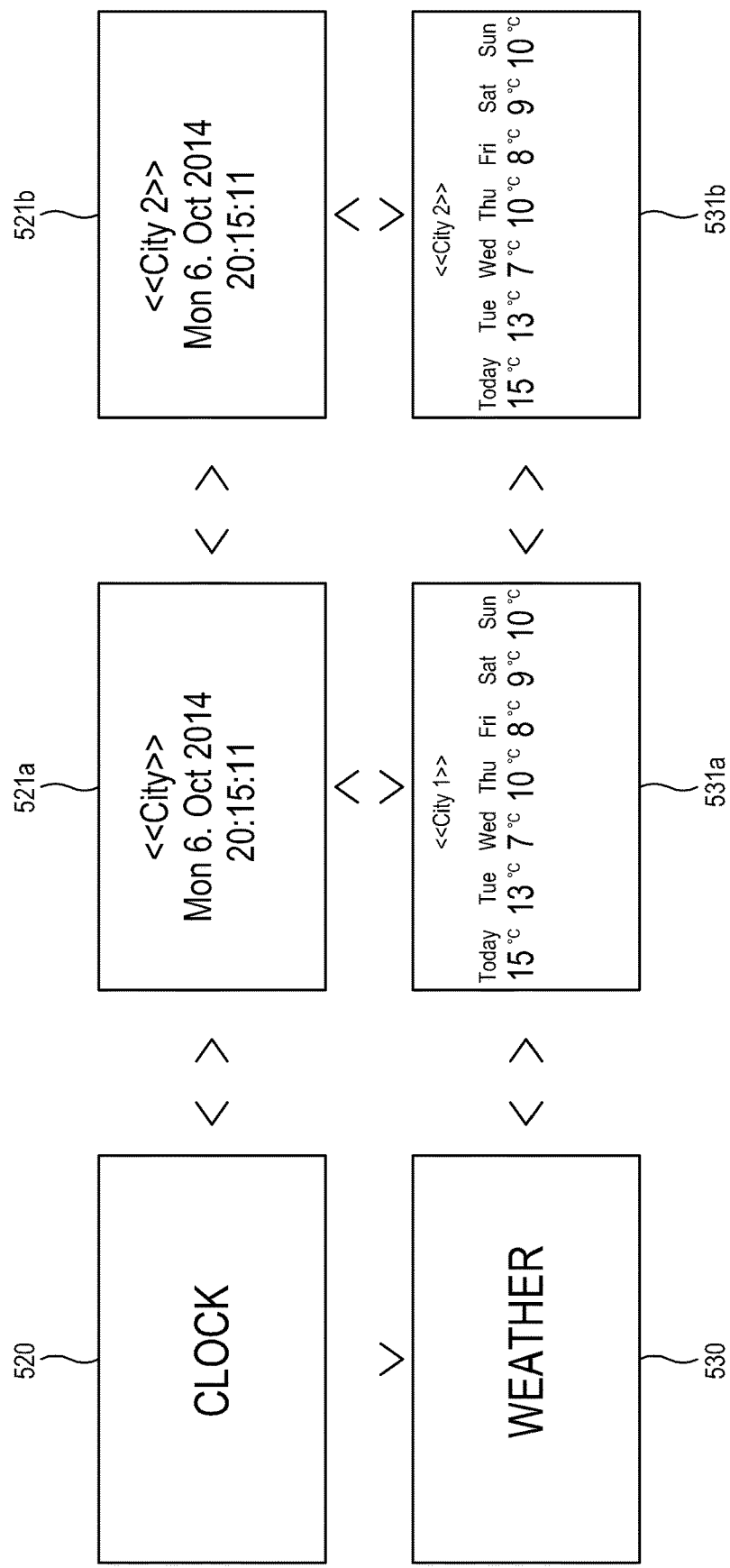
FIG. 20 illustrates switching a service image between two categories of the additional service in the display apparatus according to an exemplary embodiment.

FIG. 20 illustrates switching a service image between two categories of the additional service in the display apparatus according to an exemplary embodiment.

As shown in FIG. 20, the display apparatus is switched or moved between the categories of the additional service in response to a user's command for movement in the up and down directions. Further, the display apparatus is switched or moved between the title image 520 and information images 521*a* and 521*b*, which include information provided by a corresponding category service, within one category in response to a user's command for movement in the left and right directions.

The switching between the categories may be implemented between the title images 520 and 530 of the corresponding category.

Furthermore, if the information screens 521*a*, 521*b*, 531*a*, and 531*b* are related to each other between the categories, the vertical switching between the categories may be possible between the information images 521*a* and 521*b*; and 531*a* and 531*b*.

For example, a first information image 521*a* of the 'CLOCK' category may include time information about a region of 'City 1', and a first information image 531*a* of the 'WEATHER' category may include information about weather information about the region of 'City 1'. The first information image 521*a* and the first information image 531*a* are different in category of service information, but they are related to the same region. Since both the images 521*a* and 531*a* are related, the display apparatus can display the first information image 531*a* switched from the first information image 521*a* if there is a user's command for movement in the down direction or vice versa if there is a user's command for movement in the up direction.

Likewise, a second information image 521*b* of the 'CLOCK' category may include time information about a region of 'City 2', and a second information image 531*b* of the 'WEATHER' category may include information about weather information about the region of 'City 2'. Since both the second information image 521*b* and the second information image 531*b* are related to the same region of 'City 2', the display apparatus can display the second information image 531*b* switched from the second information image 521*b* if there is a user's command for movement in the down direction or vice versa if there is a user's command for movement in the up direction.

According to an exemplary embodiment, the display apparatus displays the service images of the additional service, switched in response to a user's command for movement in the up, down, left and right, i.e., four directions, so that a user can intuitively use the additional service.

The display apparatus which displays a service image of an additional service according to an exemplary embodiment is described in detail below.

Figure 21:
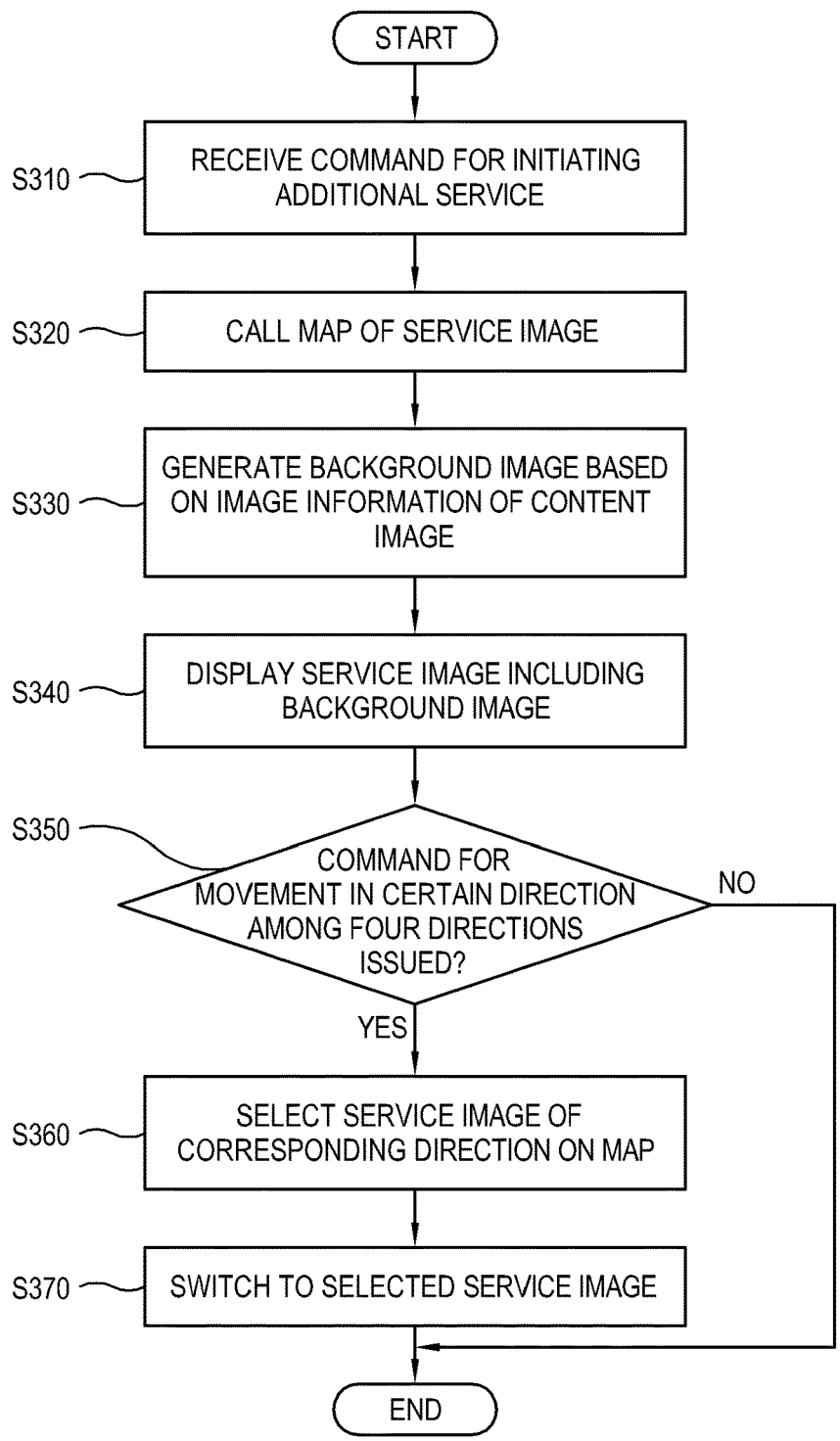
FIG. 21 is a flowchart of displaying the service image of the additional service in the display apparatus according to an exemplary embodiment.

FIG. 21 is a flowchart of displaying the service image of the additional service in the display apparatus according to an exemplary embodiment.

As shown in FIG. 21, at operation S310, the display apparatus receives a command issued by a user for providing the additional service.

At operation S320, the display apparatus calls a map of service images in which the services are mapped in accordance with moving directions, i.e., the map refers to the data of specifying matching between the service images in response to the up, down, left and right, i.e., four directions, as shown in FIG. 18 according to a non-limiting example of the map.

At operation S330, the display apparatus generates a background image based on the image information of the content image. A method of generating the background image is the same as that described above with reference to the exemplary embodiments.

At operation S340, the display apparatus displays the service image including the background image. The displayed service image may include an initial image for initiating the additional service, or a title image of a certain service category.

At operation S350, the display apparatus determines whether a user issues a command for movement in one of the up, down, left and right, i.e., four directions.

If it is determined that a user issues a command for movement in one of the up, down, left and right, i.e., four directions, at operation S360, the display apparatus selects a service image corresponding to the direction according to the map of the service image.

At operation S370, the display apparatus displays the selected service image.

According to the exemplary embodiments, the display apparatus provides intuitive environments so that a user can easily use the additional service.

In the exemplary embodiments, both the content image and the service image are displayed as full screen on the display apparatus, and thus the content image is not displayed while the service image is displayed. Further, in the exemplary embodiments, the image generated based on the image information of the content image is used as the background image for the service image. However, this is not limiting and the exemplary embodiments may be variously implemented through the modification.

Figure 22:
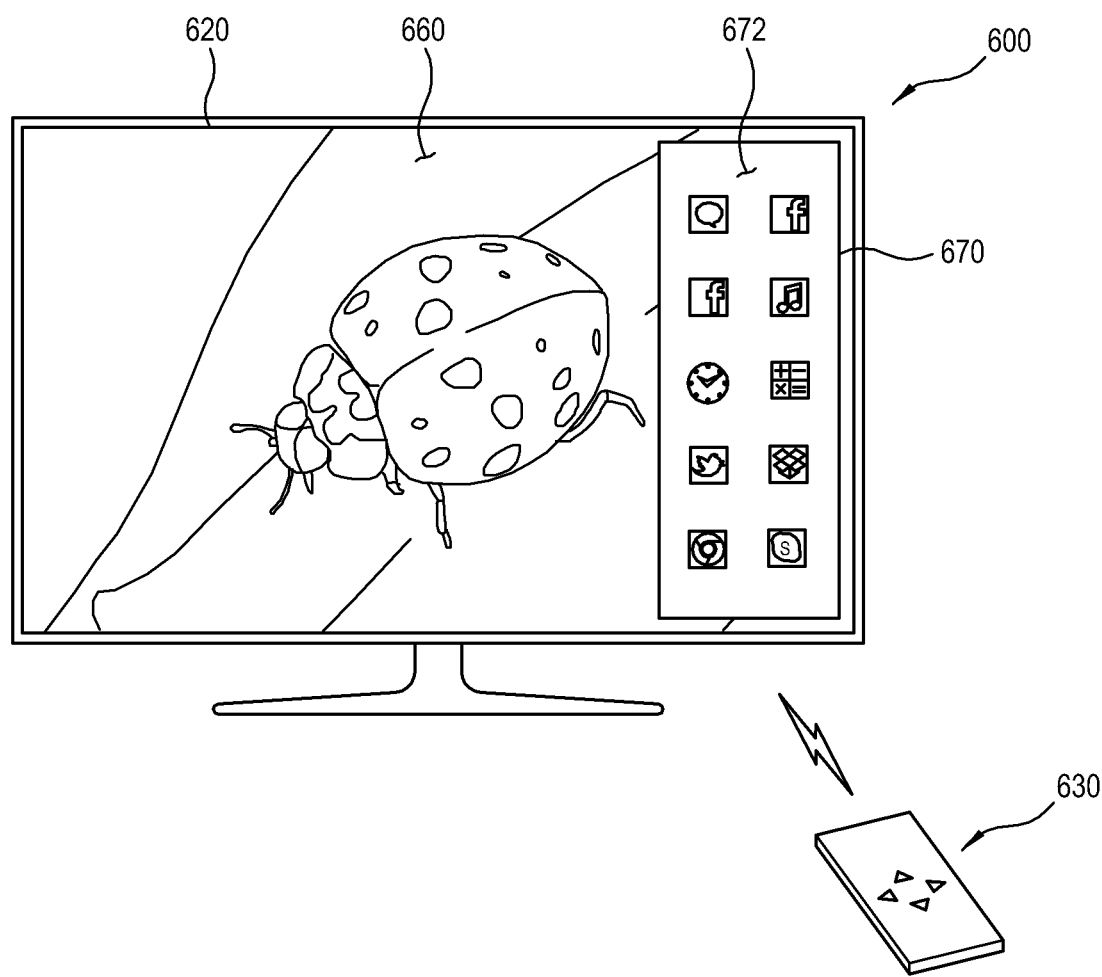
FIG. 22 illustrates an example that a content image is overlaid with a UI menu in a display apparatus according to an exemplary embodiment.

FIG. 22 illustrates an example that a content image 660 is overlaid with a UI menu 670, e.g., a GUI menu screen, in a display apparatus 600 according to an exemplary embodiment.

As shown in FIG. 22, the display apparatus 600 according to an exemplary embodiment displays the content image 660 on the display 620. If a user issues a command to display the UI menu 670 through the user input device 630 while the display 620 is displaying the content image 660, the display apparatus 600 displays the content image 660 being overlaid with the UI menu 670.

Here, if the content image 660 is displayed as a full screen on the display 620, the UI menu 670 is displayed covering a partial area of the content image 660.

When displaying the UI menu 670, the display apparatus 600 acquires the image information of the content image 660 and changes the image information based on a preset algorithm, thereby generating a background for the UI menu 670 as described in detail above. This algorithm is derivable from the methods of the exemplary embodiments described above, and detailed descriptions thereof will be omitted.

Here, the image information of the content image 660 is image information corresponding to a pixel area, which will be overlaid with the UI menu 670, within the entire pixel area of the content image 660.

According to the present exemplary embodiment, the UI menu 670 is displayed together with the content image 660 while the display of the content image 660 is continued. That is, the background of the UI menu 670 on a portion 672 of the display 620 is varied in real time depending on the display of the content image 660. Thus, a user can recognize motion in the content image 660 overlaid with the UI menu 670 through real-time change in the background of the UI menu 670.

In an exemplary embodiment, an image generated based on the image information of the content image 660 is used as the background, e.g., the second image, of the UI menu 670, but not limited thereto. As another example, an image generated based on the image information of the content image 660 may be used as an icon, a selection item, etc., of the UI menu.

Figure 23:
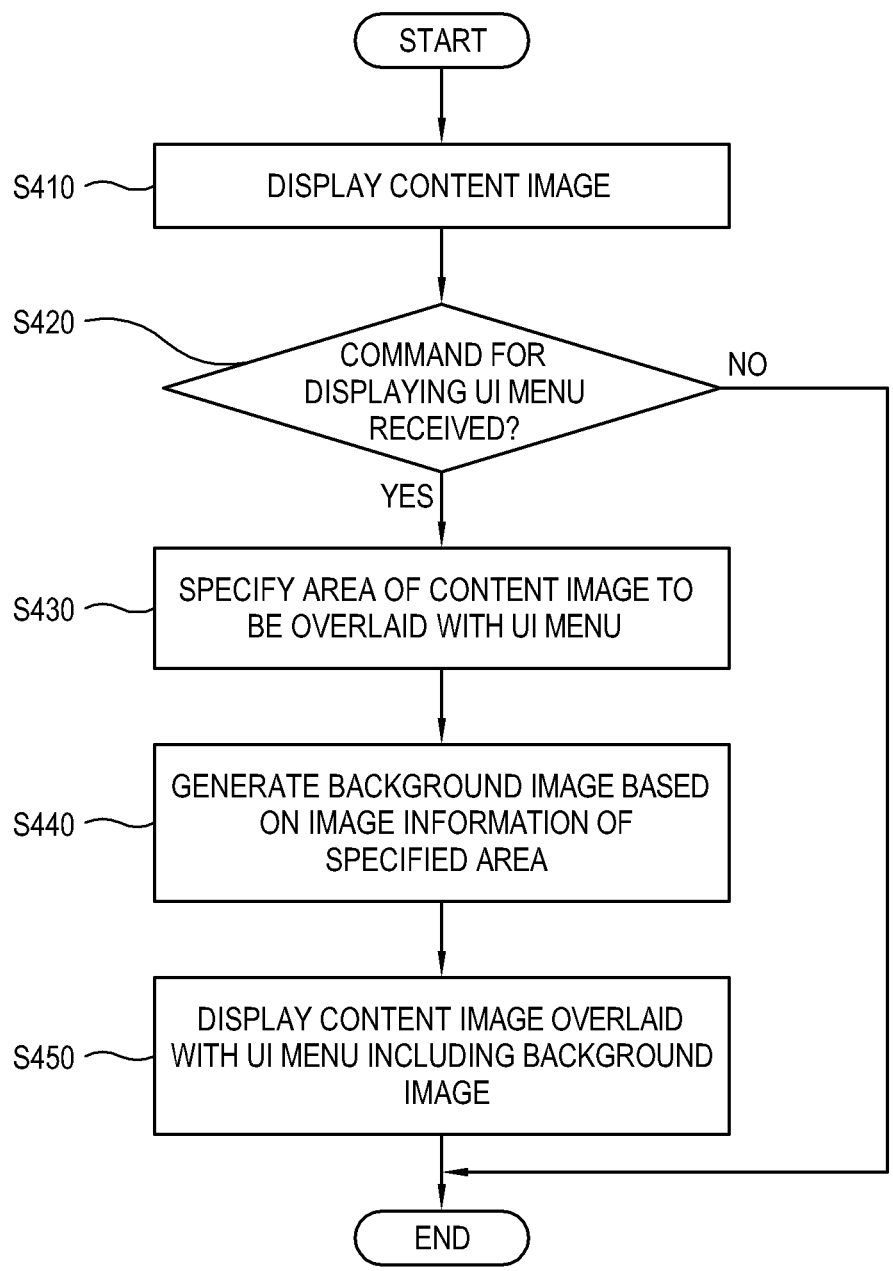
FIG. 23 is a flowchart of displaying the UI menu in the display apparatus of FIG. 22.

FIG. 23 is a flowchart of displaying the UI menu 670 in the display apparatus 600 according to an exemplary embodiment.

As shown in FIG. 23, at operation S410, the display apparatus 600 displays the content image.

At operation S420, the display apparatus 600 determines whether there is a command for displaying the UI menu.

If it is determined that there is the command for displaying the UI menu 670, at operation S430 the display apparatus 600 specifies a certain area of the content image to be overlaid with the UI menu.

At operation S440, the display apparatus 600 generates the background image by taking the image information of the certain area into account.

At operation S450, the display apparatus 600 displays the UI menu together with the generated background image so that the content image can be overlaid with the UI menu.

Figure 24:
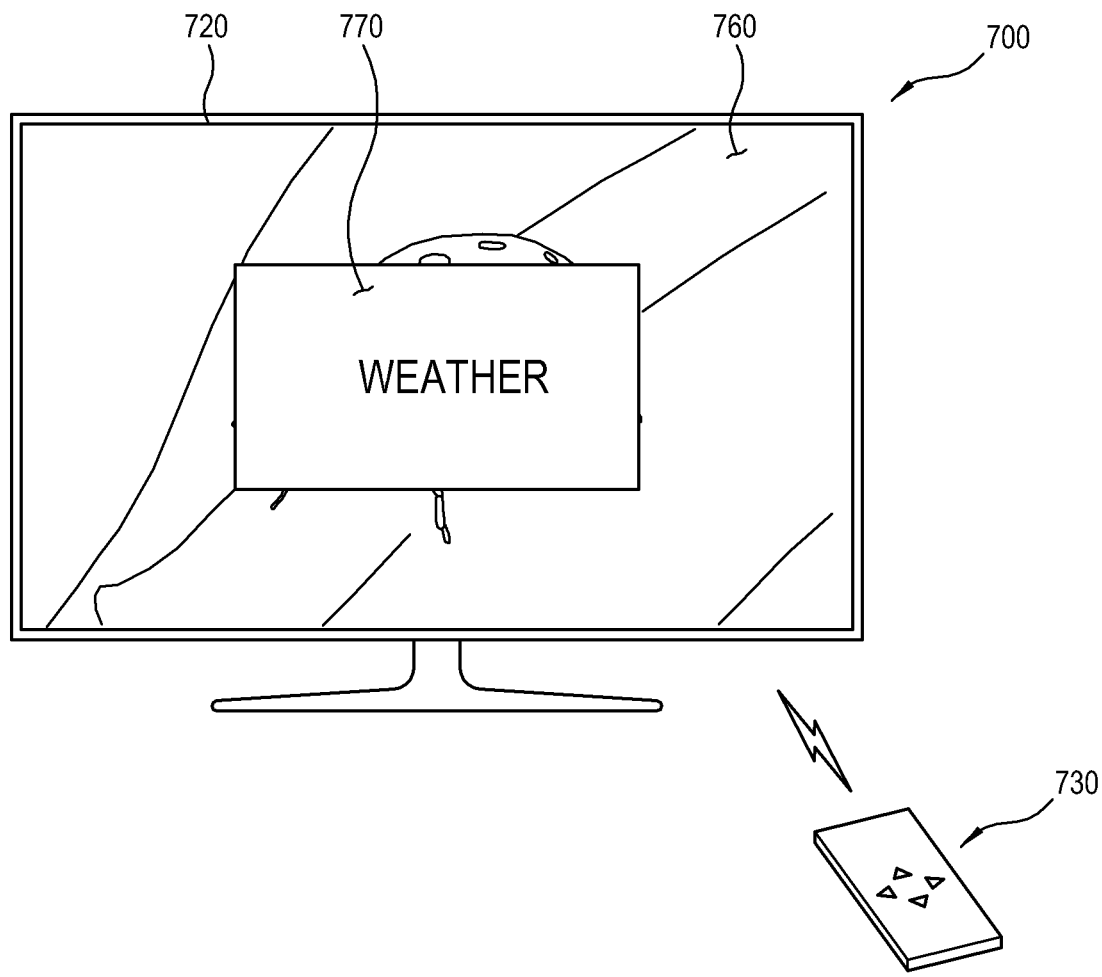
FIG. 24 illustrates an example that a service image is displayed on a content image in the form of picture in picture (PIP) in a display apparatus according to an exemplary embodiment.

FIG. 24 illustrates an example that a service image 770 is displayed on a content image 760 in the form of picture in picture (PIP) in a display apparatus 700 according to an exemplary embodiment.

As shown in FIG. 24, the display apparatus 700 displays the service image 770 in response to a command issued to execute the additional service through the user input device 730 while the display 720 is displaying the content image 760.

In some of the exemplary embodiments, the content image and the service image are displayed as the full screens, and therefore the display apparatus displays the service image by switching the content image to the service image.

On the other hand, the display apparatus 700 according to the present exemplary embodiment displays the service image 770 within the content image 760 by the PIP mode. That is, the display apparatus 700 displays the content image 760 as a main image of the PIP mode, and displays the service image 770 as a sub image of the PIP mode.

The display apparatus 700 determines an area corresponding to a position for displaying the service image 770 within the entire area of the content image 760, and acquires image information of the determined area. The display apparatus 700 generates a background image for the service image 770 based on the acquired image information.

Figure 25:
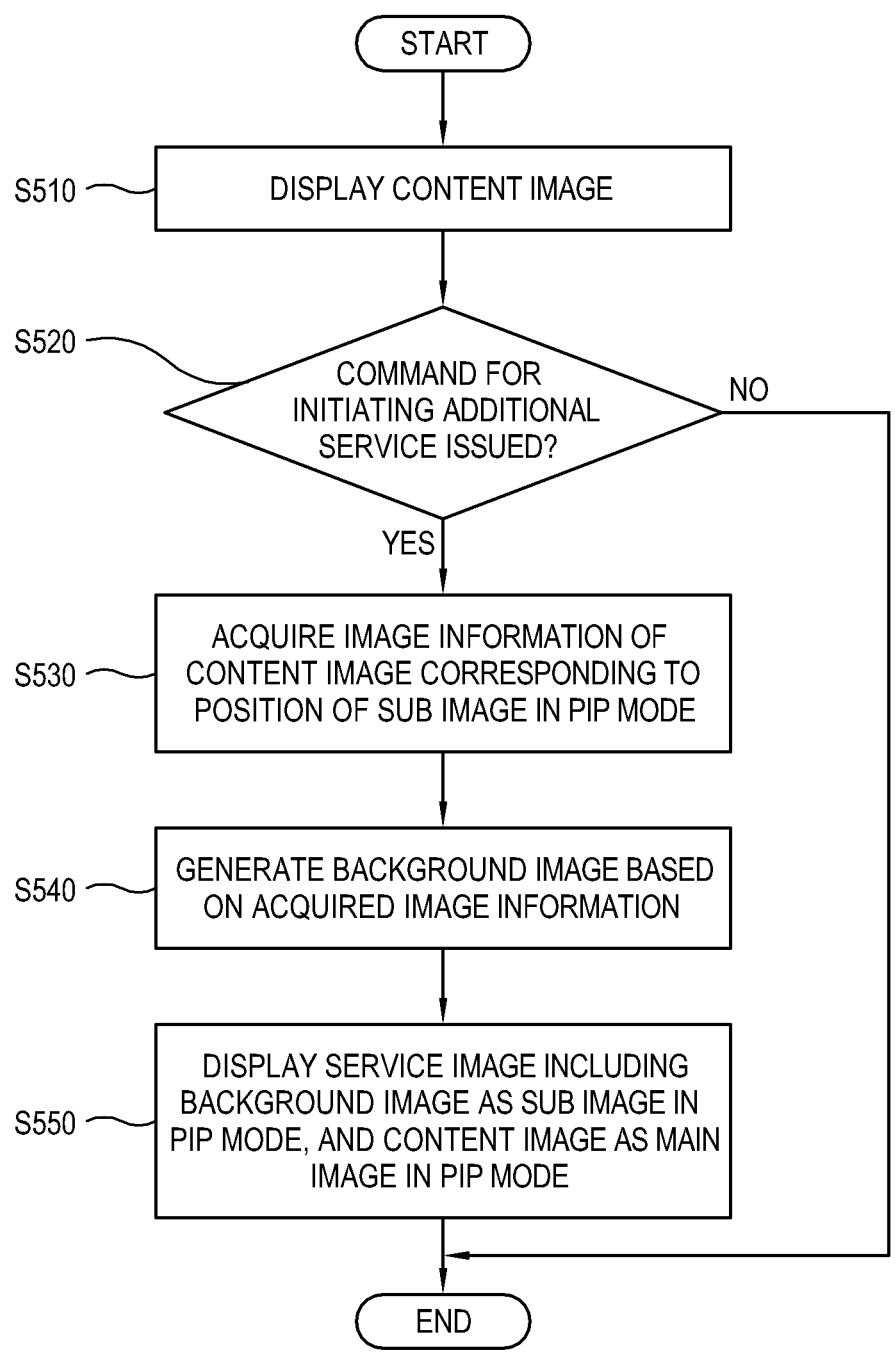
FIG. 25 is a flowchart of displaying a service image in the display apparatus of FIG. 24.

FIG. 25 is a flowchart of displaying a service image in the display apparatus 700.

As shown in FIG. 25, at operation S510, the display apparatus 700 displays a content image. In the present exemplary embodiment, the content image is displayed as a full screen.

At operation S520, the display apparatus 700 determines whether there is a command for executing the additional service.

If it is determined that there is the command for executing the additional service, at operation S530, the display apparatus 700 acquires the image information of the content image corresponding to a sub image of the PIP mode.

At operation S540, the display apparatus 700 generates the background image based on the acquired image information. A method of generating the background image is derivable from the methods of the foregoing exemplary embodiments, and thus detailed descriptions thereof will be omitted.

At operation S550, the display apparatus 700 displays the service image including the background image as the sub image of the PIP mode, and displays the content image as the main image of the PIP mode.

The UI including the background image according to the exemplary embodiments is described in more detail below.

Figure 26:
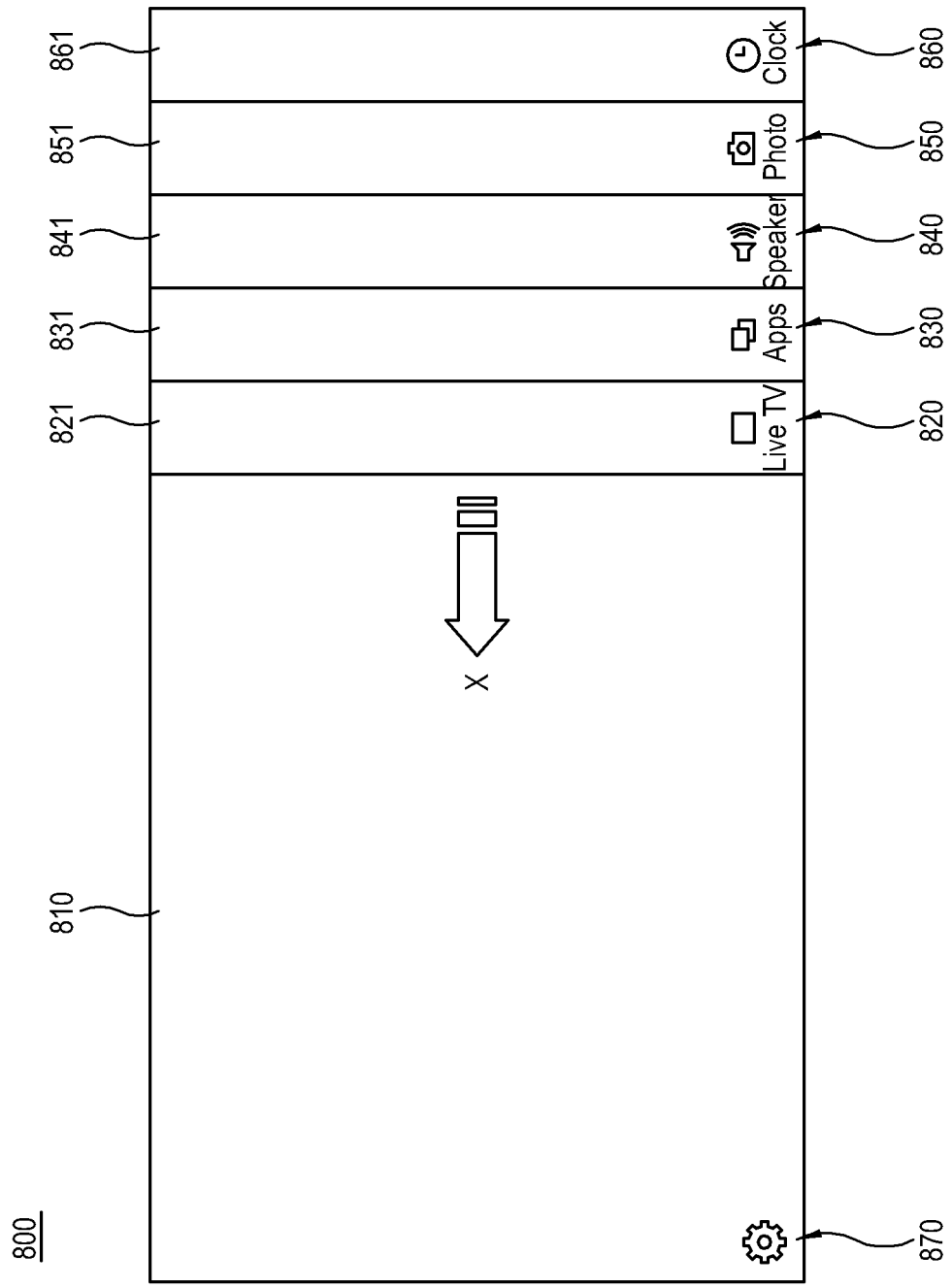
FIG. 26 illustrates an example of an image displayed in response to a user's input in a display apparatus according to an exemplary embodiment.

FIG. 26 illustrates an example of an image 800 displayed in response to a user's input in a display apparatus according to an exemplary embodiment.

As shown in FIG. 26, the display apparatus displays a main image 800 including at least one UI when a preset input is generated as a user presses a certain button on a remote controller, or when the display apparatus is turned on.

The entirety of the main image 800 is varied in real time depending on reproduction of the content image, and includes a background image 810, of which the inner lines may be continuously changed like waves in accordance with an outline of at least one object of the content image that may be moving. The background image 810 according to the present exemplary embodiment may be generated based on the same methods as those described above. The background image 810 according to the present exemplary embodiment may be also applied to various UIs as well as the main image 800 and may also be a still image.

If it is determined that no user's input is received within a preset time while the main image 800 is displayed, the display apparatus may display only the background image 810 by switching the main image 800 to the background image 810. If a user's input is received when only the background image 810 is displayed, the display apparatus is returned to displaying the main image 800, e.g., the GUI and the background image 810 as a combination image.

To execute preset services, the main image 800 includes a plurality of icons 820, 830, 840, 850, 860 and 870 respectively corresponding to the services. The respective icons 820, 830, 840, 850, 860 and 870 are positioned at a lower side of the main image 800, but there is no limit to the positions of the icons 820, 830, 840, 850, 860 and 870.

The icons 820, 830, 840, 850, 860 and 870 may be respectively labelled with titles simply describing the corresponding services. For example, the icons 820, 830, 840, 850, 860 and 870 according to an exemplary embodiment includes a TV icon 820, an application icon 830, a loudspeaker icon 840, a photo icon 850, a clock icon 860, and a background image setting icon 870. The TV icon 820, the application icon 830, the loudspeaker icon 840, the photo icon 850 and the clock icon 860 are arranged in a row at a right side of the main image 800 along a lower side edge. The background image setting icon 870, which is different in characteristic from these services, is arranged at a left side of the main image 800 along a lower side edge.

An exemplary embodiment shows the icons 820, 830, 840, 850, 860 and 870 respectively corresponding to the certain services, and the arrangement of these icons 820, 830, 840, 850, 860 and 870. However, an exemplary embodiment is only an example among various types of the GUIs which may be displayed as the main image 800, and this example is not limiting.

The TV icon 820, the application icon 830, the loudspeaker icon 840, the photo icon 850 and the clock icon 860 are respectively arranged in a plurality of areas 821, 831, 841, 851, and 861 formed by a plurality of lines extended vertically upward from the lower side of the main image 800.

Each line may have various visual effects. For example, each line may have a predetermined color, which is assimilated to the background image 810 as going upward from the lower side of the main image 800.

The respective areas 821, 831, 841, 851 and 861 may be highlighted so as to indicate selected states of the icons 820, 830, 840, 850 and 860 in the corresponding areas 821, 831, 841, 851 and 861. That is, if a user presses an arrow key of a remote controller, a highlight indicating the currently selected icon may move. For example, if the TV icon 820 is selected, the TV icon 820 is displayed to be larger than the other icons and the area 821 of the TV icon 820 is highlighted. Thus, a user can easily recognize that the TV icon 820 is currently selected.

In this state, if a user moves the highlight to the application icon 830, the TV icon 820 is returned to its original size, and the highlight on the area 821 including the TV icon 820 is released. Further, the application icon 830 is enlarged, and the area 831 including the application icon 830 is highlighted.

In the state that one of the icons 820, 830, 840, 850, 860 and 870 is selected, a user may issue a command to execute the selected icon 820, 830, 840, 850, 860 or 870 by pressing an enter key of the remote controller or the like method. In response to the command for executing the selected icon 820, 830, 840, 850, 860 or 870, the display apparatus executes the service corresponding to the selected icon 820, 830, 840, 850, 860 or 870.

The services of the respective icons 820, 830, 840, 850, 860 and 870 according to an exemplary embodiment are described below.

The display apparatus processes a currently received video signal and displays an image based on the video signal in response to the execution of the TV icon 820. The display apparatus may receive the video signal from various video sources. For example, the display apparatus may display a broadcast image based on a broadcast signal tuned to a certain channel and received from a transmitter of a broadcasting station, or an image based on a video signal received from the external device such an optical media player.

The display apparatus displays items of many applications installed therein so that the applications can be executed in response to the execution of the application icon 830.

The display apparatus displays a setting image for a loudspeaker for outputting a sound, an image showing a sound output state of the loudspeaker, etc., in response to the execution of the loudspeaker icon 840.

The display apparatus display accessible photo images in response to the execution of the photo icon 850.

The display apparatus displays a clock showing the current time in response to the execution of the clock icon 860.

The display apparatus displays a UI for changing the settings of the currently displayed background image 810 in response to the execution of the background image setting icon 870.

The display apparatus displays the UIs displayed corresponding to the respective icons 820, 830, 840, 850, 860 and 870 when each of the icons 820, 830, 840, 850, 860, and 870 is selected and executed. If one of the TV icon 820, application icon 830, the loudspeaker icon 840, the photo icon 850 and the clock icon 860 biased at the right side of the main image 800 is executed, the service is provided corresponding to the executed icon 820, 830, 840, 850 or 860. Such a service may be displayed in various forms. For example, the main image 800 may be switched to an image of providing the service corresponding to the icon 820, 830, 840, 850 or 860. As another example, one of the areas 821, 831, 841, 851 and 861 respectively including the icons 820, 830, 840, 850 and 860 may be extended toward the left side of the main image 800, i.e., in the X direction, and a UI corresponding to the icon 820, 830, 840, 850 or 860 may be displayed in the extended area 821, 831, 841, 851 or 861.

Figure 27:
FIG. 27 illustrates an example of a user interface (UI) displayed in response to execution of a TV icon in the display apparatus according to an exemplary embodiment.

FIG. 27 illustrates an example of a UI displayed in response to execution of a TV icon in the display apparatus according to an exemplary embodiment.

As shown in FIG. 27, the display apparatus processes a currently received content video signal and displays a content image 910 when a user selects and executes the TV icon 820 (see FIG. 26). The content image 910 may be varied depending on which one of video signals received in the display apparatus is selected to be currently processed. The display apparatus determines a setting state of a video signal when displaying the content image 910.

For example, the display apparatus acquires setting state information of a video signal directly before displaying the main image 800 (see FIG. 26). The setting state information includes processing information for displaying the content image 910. For example, the setting state information may include identification information of a video signal to be processed by the display apparatus among many video signals receivable in the display apparatus, identification information of a channel if the video signal involves a plurality of channels like a broadcast signal, reproducing information such as a resolution of an image or volume of a sound, etc. The display apparatus switches the main image 800 (see FIG. 26) to the content image 910 based on the setting state information.

Figure 28:
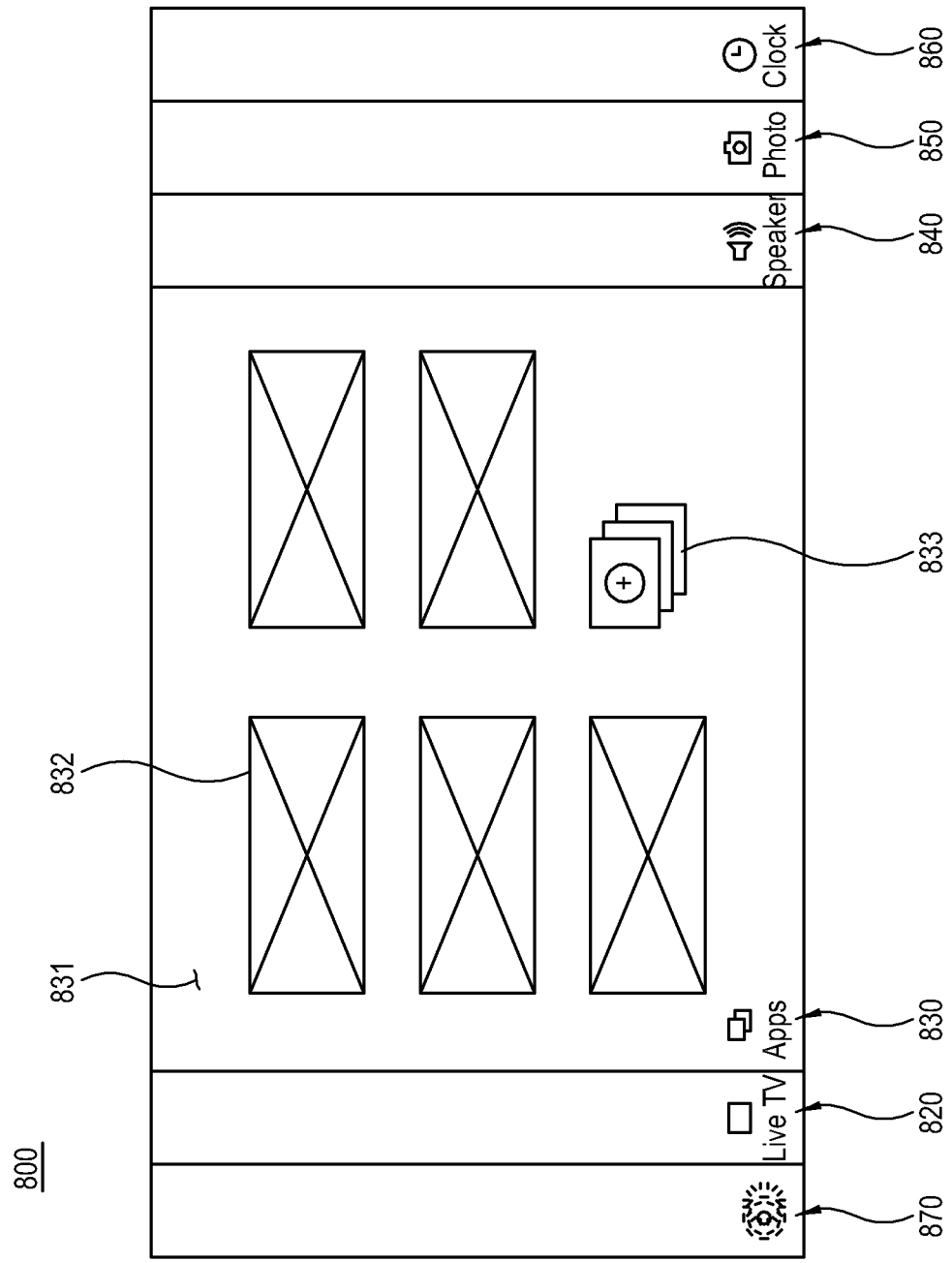
FIG. 28 illustrates an example of a UI displayed in response to execution of an application icon in the display apparatus according to an exemplary embodiment.

FIG. 28 illustrates an example of a UI displayed in response to execution of an application icon in the display apparatus according to an exemplary embodiment.

As shown in FIG. 28, the display apparatus extends the area 831 including the application icon 830 within the main image 800 in response to the execution of the application icon 830. For example, the display apparatus may extend the area 831 in such a manner that the TV icon 820 and the application icon 830, biased at the right side of the main image 800, are moved toward the left side within the main image 800, and the positions of the loudspeaker icon 840, the photo icon 850 and the clock icon 860 are maintained.

The display apparatus displays execution icons 832 of one or more applications currently stored or installed therein, which are arranged within the extended area 831. Each execution icon 832 includes a thumbnail image like a logo so that a user can intuitively recognize a corresponding application, and may additionally include title information or brief-description information of the corresponding application. When a user selects and executes one of the execution icons 832, the display apparatus executes the application corresponding to the execution icon 832.

Here, the display apparatus may highlight the selected execution icon 832 or enlarge the selected execution icon 832 so that a user can easily distinguish the currently selected execution icon 832 among the plurality of execution icons 832.

The display apparatus may further include an application addition icon 833 together with the execution icon 832 within the extended area 831. When a user executes the application addition icon 833, the display apparatus may display a UI for adding an application to be executed in the display apparatus, and additionally displays the execution icon 832 corresponding to the added application in the extended area 831.

Figure 29:
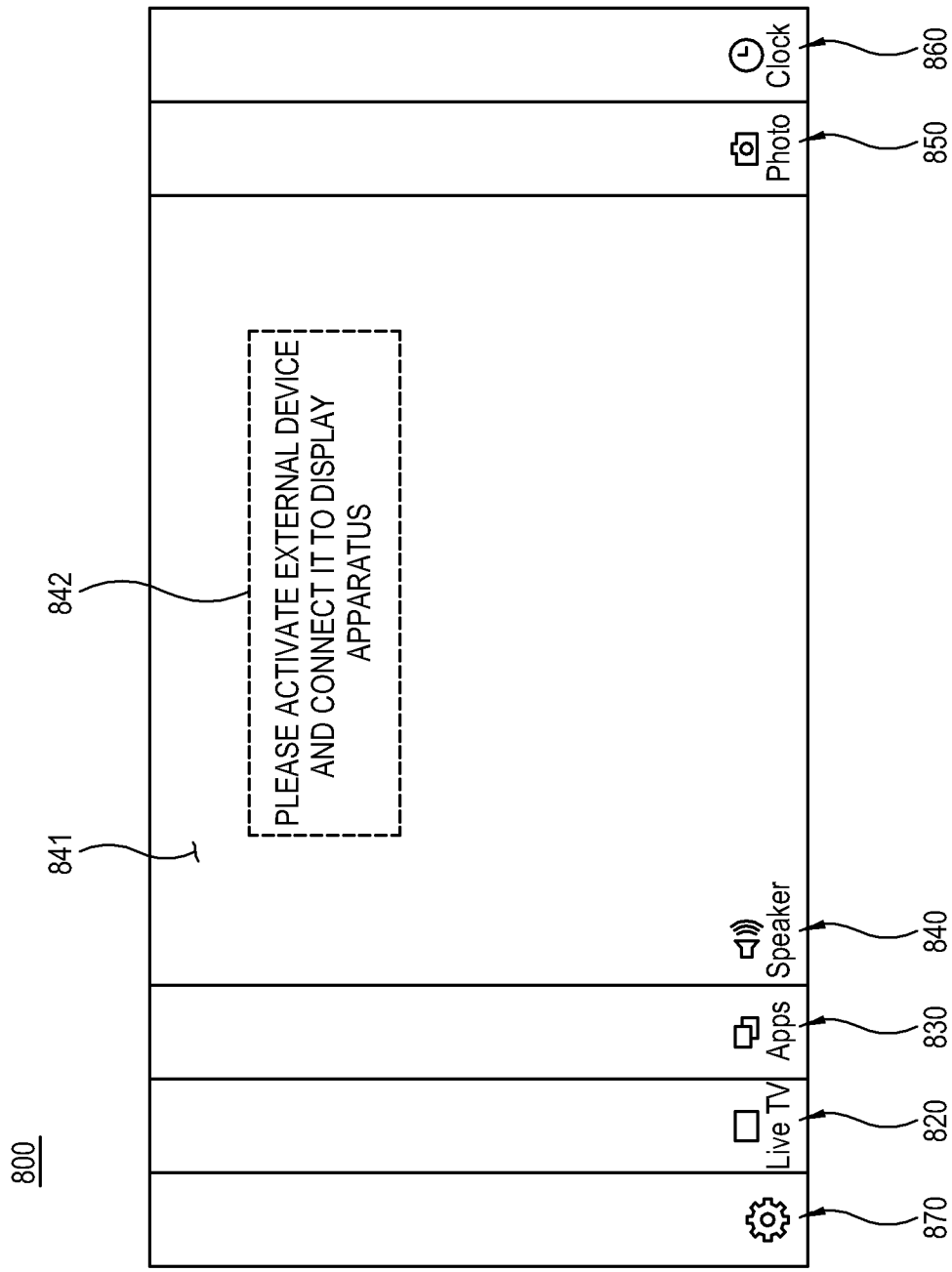
FIG. 29 illustrates an example of a UI displayed in response to execution of a loudspeaker icon in the display apparatus according to an exemplary embodiment.

FIG. 29 illustrates an example of a UI displayed in response to execution of a loudspeaker icon in the display apparatus according to an exemplary embodiment.

As shown in FIG. 29, the display apparatus extends the area 841 including the loudspeaker icon 840 in response to execution of the loudspeaker icon 840. The area 841 may be extended as described above with reference to the application icon 830.

The display apparatus determines whether an external device is connected or not thereto. Here, the external device is a device storing audio data to be output through the loudspeaker provided in the display apparatus. If it is determined that the external device is not connected to the display apparatus, the display apparatus displays a message 842, which makes a request for connection with the external device to a user, on the extended area 841.

While displaying the message 842, the display apparatus detects connection with the external device. If it is determined that the external device is connected, the display apparatus receives audio data from the external device, and processes the audio data to be output through the loudspeaker. The display apparatus displays a UI for showing the output state of the audio data while the audio data is output through the loudspeaker.

Figure 30:
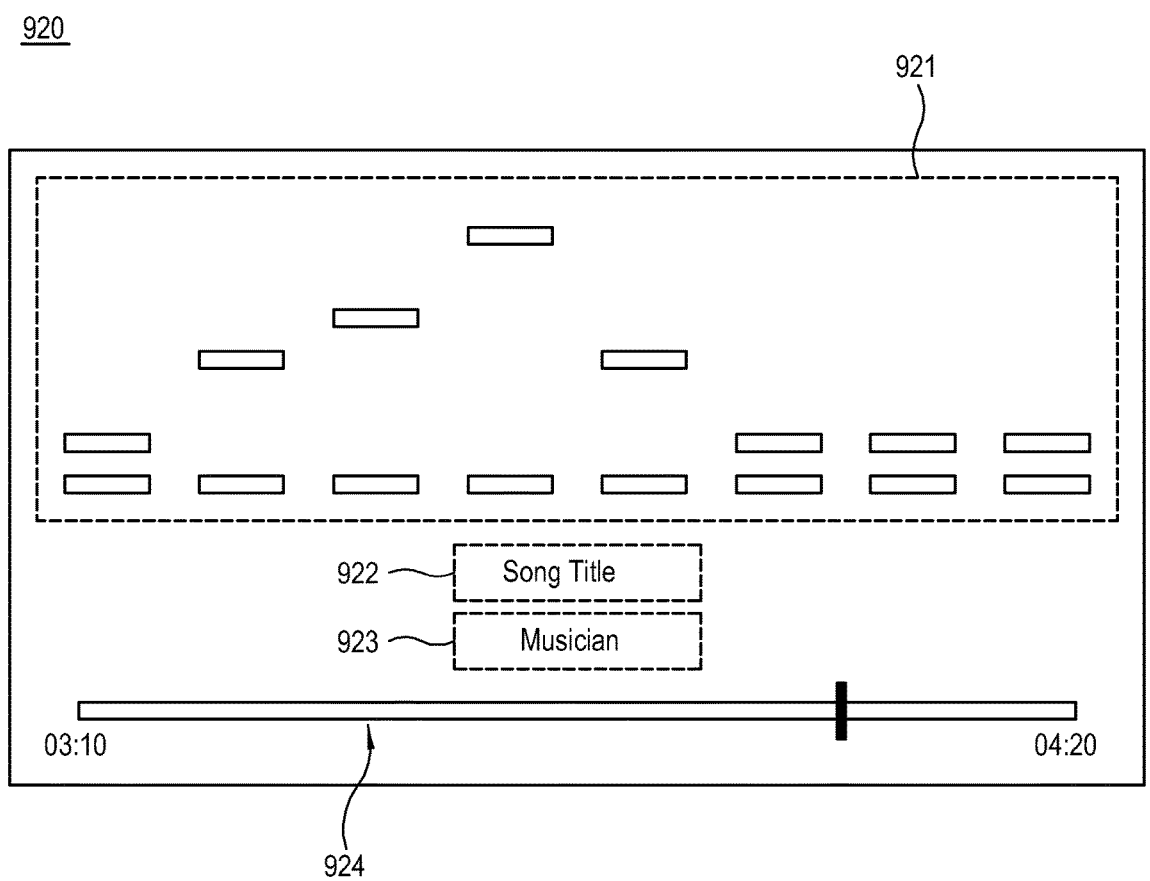
FIG. 30 illustrates an example of a UI showing an output level of a loudspeaker in the display apparatus according to an exemplary embodiment.

FIG. 30 illustrates an example of a UI showing an output level of a loudspeaker in the display apparatus according to an exemplary embodiment.

As shown in FIG. 30, the display apparatus displays a UI 920 showing output state information of audio data while the audio data is output through the loudspeaker. For example, the output state information of the UI 920 may include equalizer visualization 921 showing levels of audio data corresponding to frequencies, title information 922 of the audio data, information 923 about a writer, a player or a singer, a time bar 924 where an indicator for indicating the current reproducing point is moved in real time, etc. Besides, the UI 920 show a variety of pieces of information related to the audio data.

While the audio data is reproduced, the equalizer visualization 921 and the indicator of the time bar 924 in the UI 920 are varied in real time depending on the reproducing state. If the audio data is paused, the equalizer visualization 921 and the indicator of the time bar 924 in the UI 920 are also stopped. In addition, the display apparatus may display a message for informing a paused state on the UI 920 when the audio data is paused.

Figure 31:
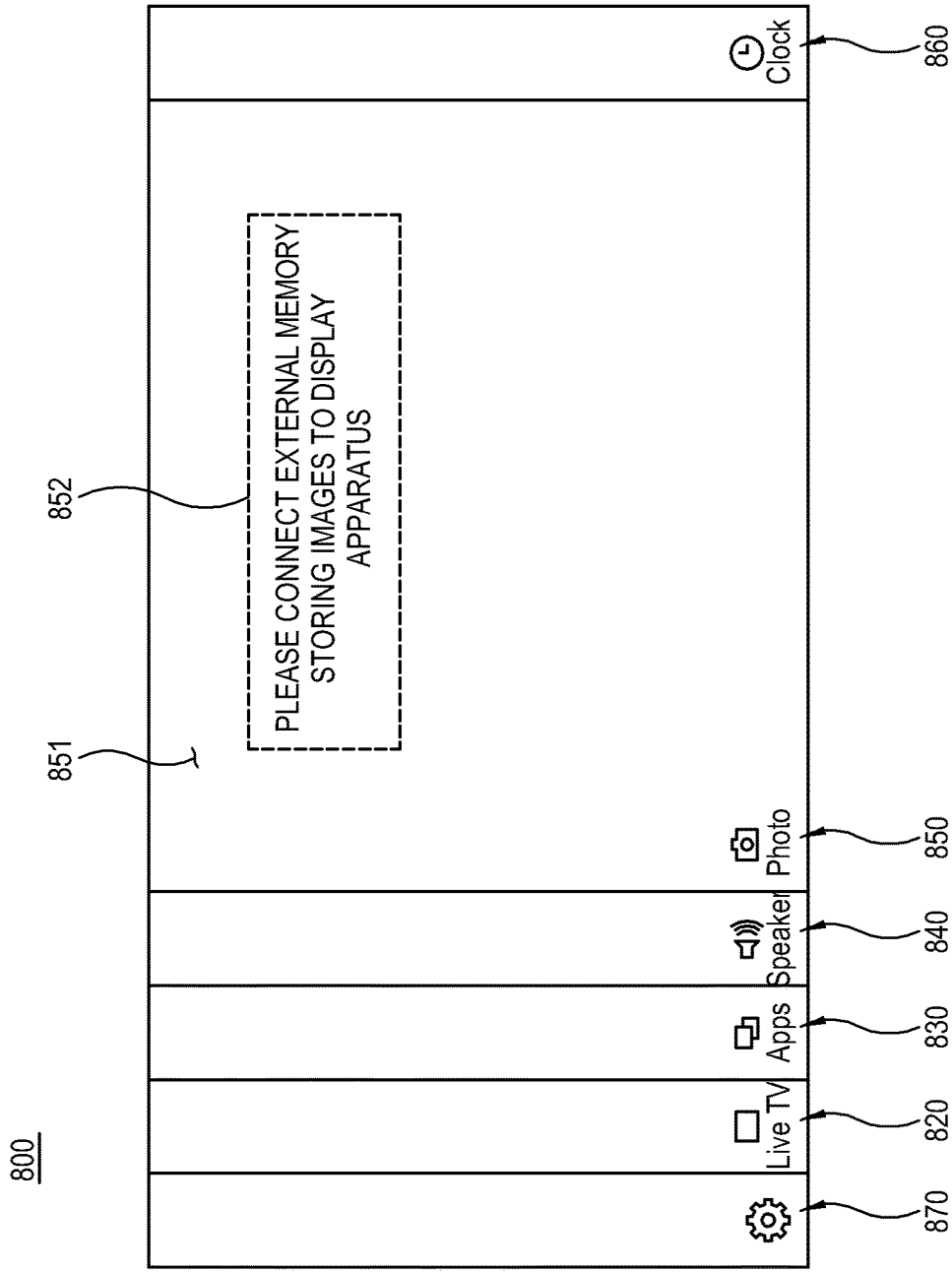
FIG. 31 illustrates an example of a UI displayed in response to execution of a photo icon in the display apparatus according to an exemplary embodiment.

FIG. 31 illustrates an example of a UI displayed in response to execution of a photo icon in the display apparatus according to an exemplary embodiment.

As shown in FIG. 31, the display apparatus extends the area 851 including the photo icon 850 in response to the execution of the photo icon 850. Here, the area 851 may be extended as described above with reference to the application icon 830.

The display apparatus determines whether an external device or an external memory is connected thereto. Here, the external device or external memory is a device in which images to be displayed by the display apparatus are stored. If it is determined that the external memory storing the images is not connected to the display apparatus, the display apparatus displays a message 852, which guides a user to connect the external memory storing the images to the display apparatus, on the extended area 851.

If the display apparatus detects the connection with the external memory while displaying the message 852, the display apparatus receives an image from the external memory and displays a UI for showing the received image.

If the external memory connected to the display apparatus includes no images, the display apparatus may display a message, which informs no images in the external memory, on the extended area 851. Here, the presence of the image may be determined based on whether there is an image of which format is processible by the display apparatus.

Figure 32:
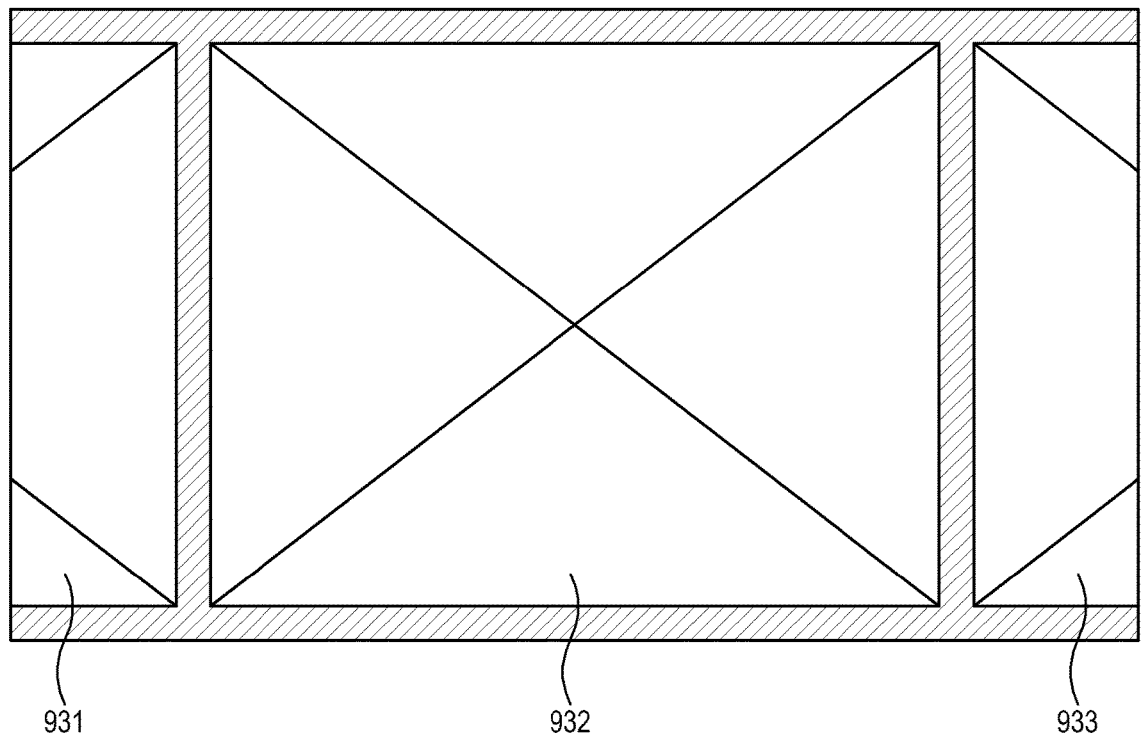
FIG. 32 illustrates an example of displaying an image in the display apparatus according to an exemplary embodiment.

FIG. 32 illustrates an example of displaying an image in the display apparatus according to an exemplary embodiment.

As shown in FIG. 32, the display apparatus buffers images 931, 932 and 933 received from the external memory. Here, the number of data amount of images 931, 932 and 933 to be buffered may be varied depending on configuration of the display apparatus or settings customized by a user.

The display apparatus may display the buffered images 931, 932 and 933 in various modes. For example, the display apparatus may display the images 931, 932 and 933 in a slide-show mode. The display apparatus displays a slide-show UI 930, and moves the images 931, 932 and 933 at a preset speed within the UI 930. Under the slide-show mode, the plurality of images 931, 932 and 933 are automatically scrolled without a user's input for switching the images 931, 932 and 933. Thus, the display apparatus can display the plurality of images 931, 932 and 933 in sequence.

When the display apparatus displays the plurality of images 931, 932 and 933 in the slide-show mode, the images 931, 932 and 933 may move at a uniform speed without stopping. As another example, the display apparatus may stop the images 931, 932 and 933 from moving for a preset time if a certain image 932 is positioned at the center, and then move the images 931, 932 and 933 again after the preset time elapses. In this case, a user can easily view the images 931, 932 and 933 since the images 931, 932 and 933 are stopped for the preset time when they are individually positioned at the center.

Figure 33:
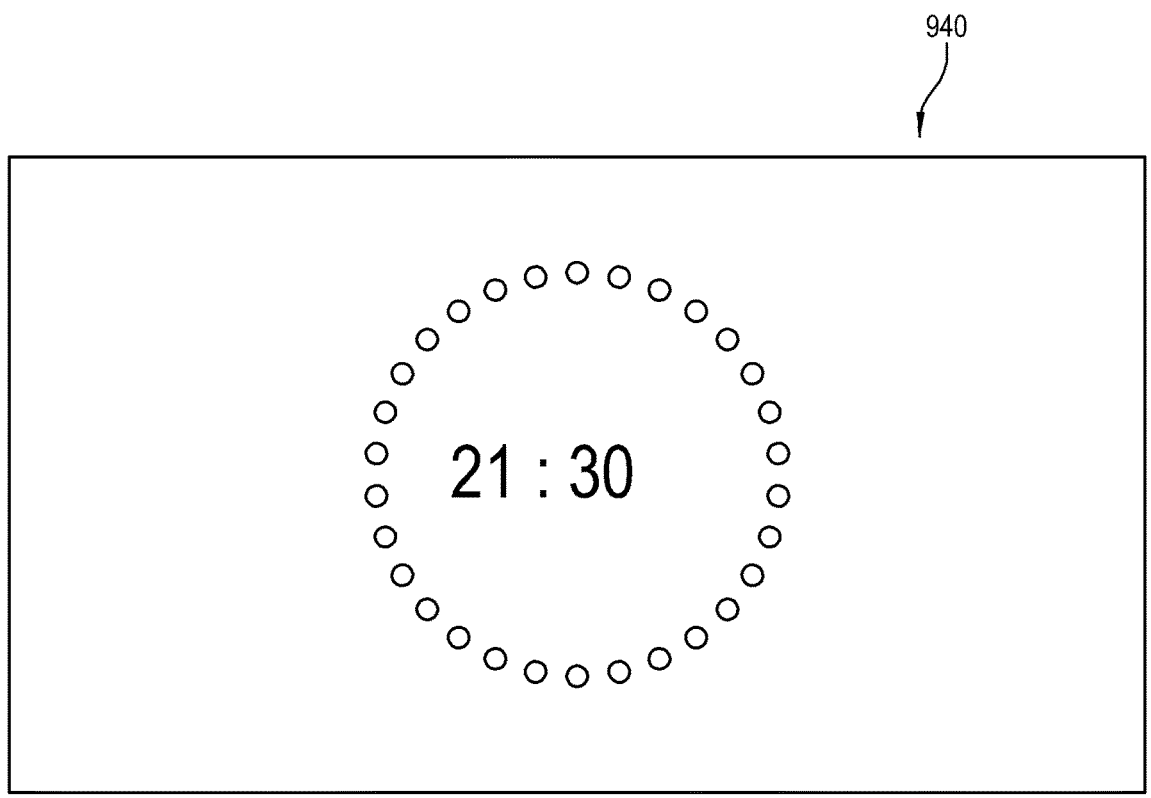
FIG. 33 illustrates an example of a UI displayed in response to execution of a clock icon in the display apparatus according to an exemplary embodiment.

FIG. 33 illustrates an example of a UI displayed in response to execution of a clock icon in the display apparatus according to an exemplary embodiment.

As shown in FIG. 33, the display apparatus displays a UI 940 showing the current time in response to the execution of the clock icon 860 (see FIG. 26). The UI 940 may show various types of clocks such as an analog clock, a digital clock, etc., as long as it can show information about the current time.

The display apparatus may make at least a part of the UI 940 flicker so that a user can recognize that the UI 940 normally shows the current time. For example, the display apparatus may make ":" flicker between a numeral corresponding to hours and a numeral corresponding to minutes in units of second.

Figure 34:
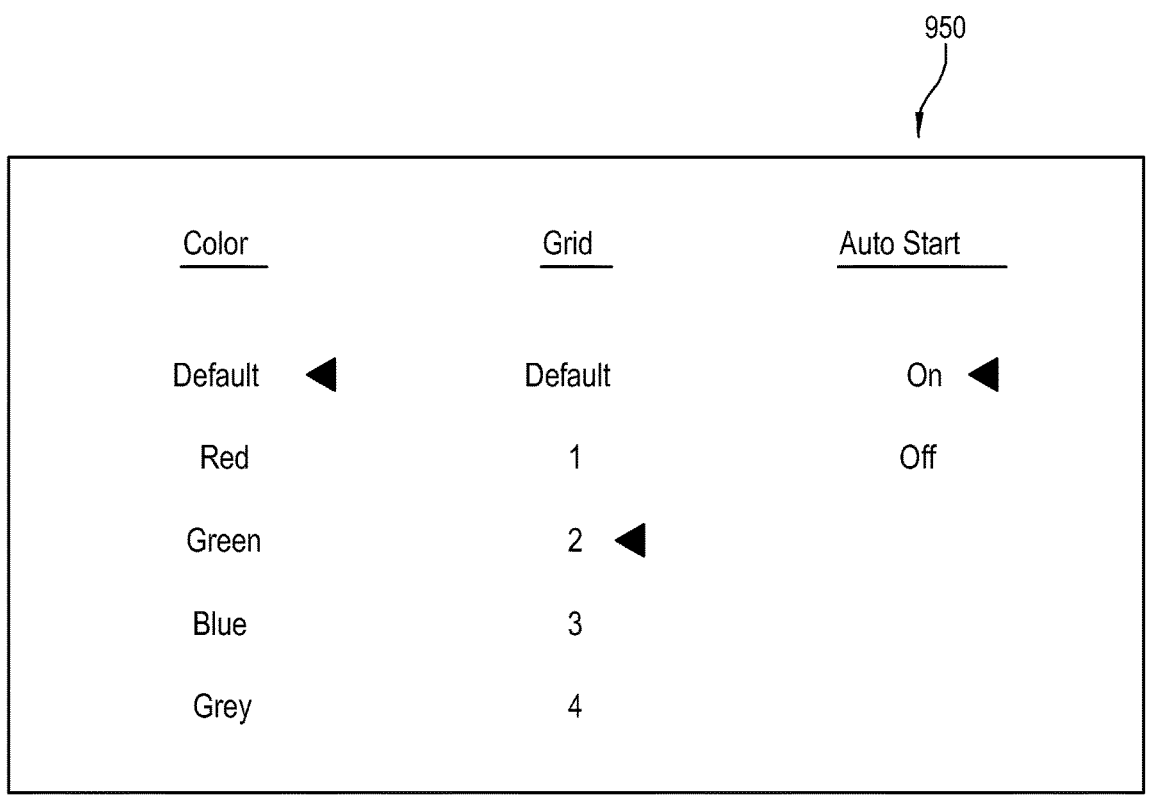
FIG. 34 illustrates an example of a UI displayed in response to execution of a background image setting icon in the display apparatus according to an exemplary embodiment.

FIG. 34 illustrates an example of a UI displayed in response to execution of a background image setting icon in the display apparatus according to an exemplary embodiment.

As shown in FIG. 34, the display apparatus displays a UI 950 providing options for changing the settings of the background image in response to the execution of the background image setting icon 870 (see FIG. 26). The UI 950 may be provided to set three option items of 'Color', 'Grid' and 'Auto Start'. However, the options set through the UI 950 according to an exemplary embodiment are only an example, and this is not limiting.

The 'Color' item is to select a main color of the background image as a curtain effect of showing a silhouette of the content image. The 'Color' item allows one of red, green, blue and gray to be selectable in addition to a default value. The display apparatus displays the background image for the UI based on the color selected in the 'Color' item.

The 'Grid' item is to designate the size of grids for dividing the image when the background image is generated.

The 'Auto Start' item is to determine whether to designate the main image 800 (see FIG. 26) as an initial image displayed when the display apparatus is turned on. If the 'Auto Start' item is set to 'On', the display apparatus sets the main image as the initial image. On the other hand, if the 'Auto Start' item is set to 'Off', the display apparatus does not set the main image as the initial image and may for example display a content image when the system is powered on.

As described above, the display apparatus can display various types of UI with the background image having the curtain effect.

The display apparatus which provides a UI for adjusting the functions thereof according to an exemplary embodiment is described in detail below.

Figure 35:
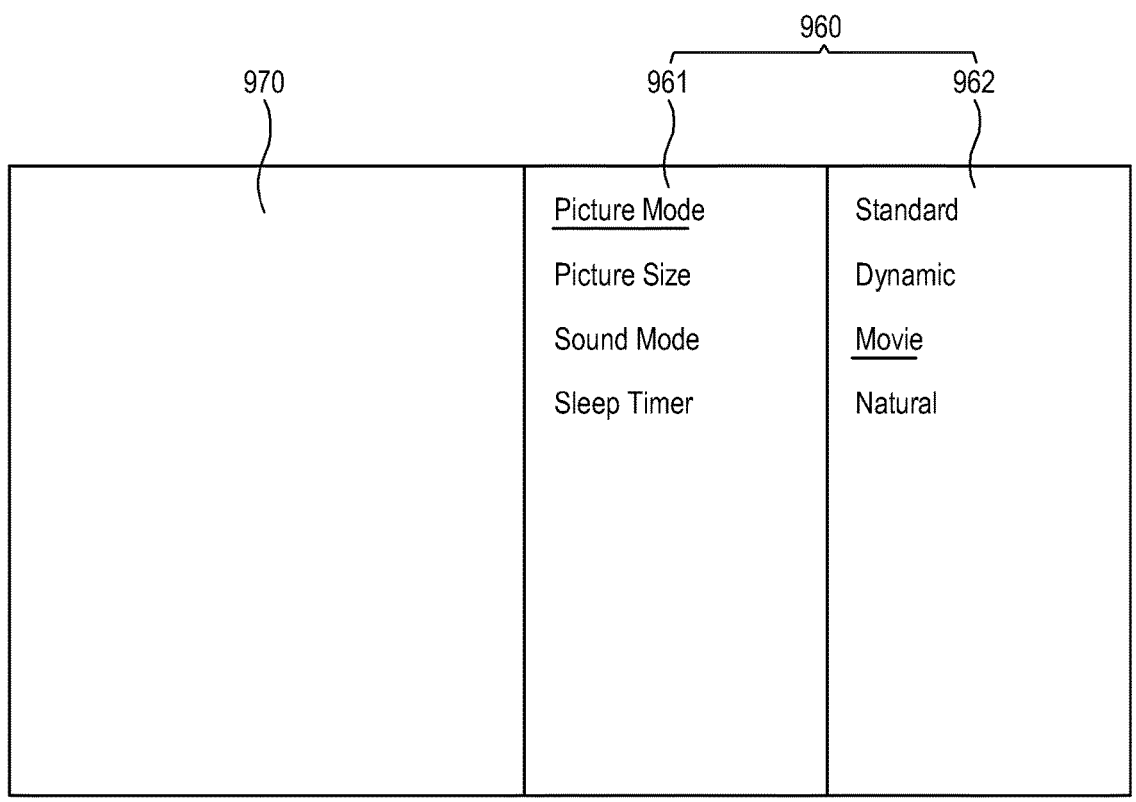
FIG. 35 illustrates an example of a UI for function adjustment provided in a display apparatus according to an exemplary embodiment.

FIG. 35 illustrates an example of a UI for function adjustment provided in a display apparatus according to an exemplary embodiment.

As shown in FIG. 35, the display apparatus displays a UI 960 for adjusting various functions thereof on a content image 970 in response to a preset user's input, e.g., a button input of a remote controller.

When the display apparatus displays the UI 960 on the content image 970, there is no limits to a position of the UI 960. As shown in FIG. 35, the display apparatus may display the UI 960 sliding from the right side of the content image 970, or may display the UI 960 sliding from the left side, the upper side or the lower side of the content image 970.

The UI 960 may have a transparency of a predetermined value. Therefore, the content image 970 behind the UI 960 is seen through the UI 960. Here, the UI 960 is divided into a first area 961 and a second area 962, and the first area 961 and the second area 962 may be different in transparency and thus easily distinguished from each other.

In the first area 961, adjustable function items of the display apparatus are arranged to be selectable. In the second area 962, setting values about a certain item selected among the plurality of items displayed on the first area 961 are arranged.

For example, the display apparatus displays the items such as a 'Picture Mode' for selecting a picture mode, a 'Sound Mode' for selecting a sound mode, a 'Sleep Timer' for selecting automatic termination time, etc., on the first area 961. When a user presses an arrow button on the remote controller, a cursor may move between the items on the first area 961.

Further, the display apparatus displays a plurality of setting values, which are provided with regard to a certain item currently selected in the first area 961, on the second area 962. As a user moves between the items of the first area 961, the items are alternated between selected and unselected, and thus the setting values are also changed on the second area 962.

For example, if the 'Picture Mode' is selected among the items on the first area 961, the display apparatus displays 'Standard', 'Dynamic', 'Movie' and 'Natural' as the setting value of the Picture Mode' on the second area 962. If one of the setting values is selected by a user, the display apparatus adjusts it function based on the selected setting value.

The methods according to the foregoing exemplary embodiments may be achieved in the form of a program command that can be implemented in various computers, and recorded in a computer-readable medium. Such a computer-readable medium may include a program command, a data file, a data structure or the like, or combination thereof. For example, the computer-readable medium may be stored in a volatile or nonvolatile storage such as a read only memory (ROM) or the like, regardless of whether it is deletable or rewritable, for example, a RAM, a memory chip, a device or integrated circuit (IC) like memory, or an optically or magnetically recordable or machine-readable (e.g., a computer-readable) storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the exemplary embodiments. The program command recorded in this storage medium may be specifically designed and configured according to the exemplary embodiments, or may be publicly known and available to those skilled in the art of computer software.

Although a few exemplary embodiments have been shown and described, it would be appreciated by those skilled in the art that changes may be made in the exemplary embodiments without departing from the principles and spirit of the inventive concept, the scope of which is defined in the claims and their equivalents.

What is claimed is:

1. A display apparatus comprising:
   a display;
   a tuner configured to receive a broadcast signal;
   an input unit; and
   a processor configured to:
      process the broadcast signal received from the tuner,
      control the display to display a moving video image comprising a plurality of image frames based on the processed broadcast signal,
      based on a user input for displaying a menu graphical user interface (GUI) being received, obtain an image frame from among the plurality of image frames,
      divide the obtained image frame into a plurality of sections,
      adjust horizontal widths of each of the plurality of sections based on red, green, and blue (RGB) values of pixels in each of the plurality of sections,
      apply blur filtering to the plurality of sections having the adjusted horizontal widths, and
      control the display to display the menu GUI on a background image comprising the plurality of sections to which the blur filtering is applied,
   wherein the background image is generated in real time based on the plurality of image frames.

2. The display apparatus according to claim 1, wherein the processor is further configured to generate the background image by processing image information acquired from the moving video image.

3. The display apparatus according to claim 2, wherein the processor is further configured to acquire the image information changed by continual processing of the moving video image in the real time, and process the background image to be varied depending on the image information acquired in the real time.

4. The display apparatus according to claim 3, wherein the processor is further configured to gradually change the RGB values of the background image so that the background image is changed with respect to a color over a time period.

5. The display apparatus according to claim 2, wherein the image information comprises the RGB values of pixels included in image frames of the moving video image.

6. The display apparatus according to claim 5, wherein the processor is further configured to generate the background image by determining brightness values and transparency values based on averaged RGB values of pixels respectively included in the plurality of sections, and adjusting the horizontal widths of the plurality of sections based on the brightness values, respectively.

7. The display apparatus according to claim 6, wherein the processor is further configured to adjust the horizontal widths of the plurality of sections having higher brightness values to be more narrow, and to adjust the horizontal widths of the plurality of sections having lower brightness values to be wider.

8. The display apparatus according to claim 6, wherein each of the plurality of sections is surrounded by edges including an upper edge, a lower edge, a left edge, and a right edge, and
the processor is further configured to apply the blur filtering to the left edge and the right edge of the plurality of sections, respectively.

9. The display apparatus according to claim 1, wherein the processor is further configured to control the display to display, on the menu GUI, user interfaces (UIs) respectively corresponding to services provided by the display apparatus, and
the UIs are configured to be switched therebetween in response to a command received through the input unit for indicating a direction of a movement in one direction among an up direction, a down direction, a left direction, and a right direction, with respect to a screen of the display.

10. The display apparatus according to claim 9, wherein the processor is further configured to switch between the UIs of the services which are different from one another, in response to the command received through the input unit for the movement in the up direction or the down direction, and switch between the UIs of a same service in response to the command received through the input unit for the movement in the left direction or the right direction.

11. A method of controlling a display apparatus comprising a display and a tuner configured to receive a broadcast signal, the method comprising:
processing the received broadcast signal;
displaying a moving video image comprising a plurality of image frames based on the processed broadcast signal,
based on a user input for displaying a menu graphical user interface (GUI) being received, obtaining an image frame from among the plurality of image frames,
dividing the obtained image frame into a plurality of sections,
adjusting horizontal widths of each of the plurality of sections based on red, green, and blue (RGB) values of pixels in each of the plurality of sections,
applying blur filtering to the plurality of sections having the adjusted horizontal widths, and
displaying the menu GUI on a background image comprising the plurality of sections to which the blur filtering is applied,
wherein the background image is generated in real time based on the plurality of image frames.

12. The method according to claim 11, wherein the obtaining the image frame comprises:
processing image information acquired from the moving video image.

13. The method according to claim 12, further comprising:
acquiring the image information changed by continual processing of the moving video image in the real time; and
processing the background image to be varied depending on the image information acquired in the real time.

14. The method according to claim 13, further comprising:
gradually changing the RGB values of the background image so that the background image is changed with respect to a color over a time period.

15. The method according to claim 12, wherein the image information comprises the RGB values of pixels included in image frames of the moving video image.

16. The method according to claim 15, wherein the adjusting the horizontal widths further comprises:
determining brightness values and transparency values based on averaged RGB values of pixels respectively included in the plurality of sections; and
adjusting the horizontal widths of the plurality of sections based on the brightness values, respectively.

17. The method according to claim 16, wherein the adjusting the horizontal widths further comprises:
adjusting the horizontal widths of the plurality of sections having higher brightness values to be more narrow; and
adjusting the horizontal widths of the plurality of sections having lower brightness values to be wider.

18. The method according to claim 16, wherein each of the plurality of sections is surrounded by edges including an upper edge, a lower edge, a left edge, and a right edge, and
the applying the blur filtering further comprises applying the blur filtering to the left edge and the right edge of the plurality of sections, respectively.

19. The method according to claim 11, wherein the displaying the menu GUI further comprises displaying user interfaces (UIs) respectively corresponding to services provided by the display apparatus, and
the UIs are configured to be switched therebetween in response to a command being received, the command indicating a direction of a movement in one direction among an up direction, a down direction, a left direction, and a right direction, with respect to a display screen.

20. The method according to claim 19, further comprising:
switching between the UIs which provide the services different from one another, in response to the command being received, for the movement in the up direction or the down direction; and
switching between the UIs of a same service, in response to the command being received, for the movement in the left direction or the right direction.

21. The display apparatus according to claim 1, wherein the background image is seen through the displayed menu GUI having a transparency.

22. The display apparatus according to claim 1, wherein the processor is further configured to adjust the horizontal widths of first sections, among the plurality of sections, that include the RGB values of pixels with a greater brightness to be smaller than the horizontal widths of second sections, among the plurality of sections, that include the RGB values of pixels with a lower brightness.

* * * * *